(12) United States Patent
Liu

(10) Patent No.: US 10,924,201 B2
(45) Date of Patent: Feb. 16, 2021

(54) DATA SENDING METHOD, SIGNALING SENDING METHOD, APPARATUS, AND SYSTEM

(71) Applicant: HUAWEI TECHNOLOGIES CO., LTD., Guangdong (CN)

(72) Inventor: Kunpeng Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/272,480

(22) Filed: Feb. 11, 2019

(65) Prior Publication Data

US 2019/0173607 A1 Jun. 6, 2019

Related U.S. Application Data

(63) Continuation of application No. PCT/CN2017/097008, filed on Aug. 11, 2017.

(30) Foreign Application Priority Data

Aug. 12, 2016 (CN) .......................... 201610821803.2

(51) Int. Cl.
*H04L 1/00* (2006.01)
*H04L 5/00* (2006.01)
(Continued)

(52) U.S. Cl.
CPC ........... *H04L 1/0003* (2013.01); *H04B 1/713* (2013.01); *H04B 7/0404* (2013.01);
(Continued)

(58) Field of Classification Search
CPC combination set(s) only.
See application file for complete search history.

(56) References Cited

U.S. PATENT DOCUMENTS 9,609,647 B2 * 3/2017 You .................... H04W 72/044
2009/0023451 A1 1/2009 Pan et al.
(Continued)

FOREIGN PATENT DOCUMENTS

CN 101808409 A 8/2010
CN 102170330 A 8/2011
(Continued)

OTHER PUBLICATIONS

R1-164310 ZTE Corporation et al.,"Enhancements on Beamformed CSI-RS",3GPP TSG RAN WG1 Meeting #85, Nanjing, China May 23-27, 2016,total 6 pages.
(Continued)

*Primary Examiner* — Ronald B Abelson
(74) *Attorney, Agent, or Firm* — David William Roe

(57) ABSTRACT

This application discloses a data sending method, a signaling sending method, an apparatus, and a system, and relates to the communications field. The method includes: receiving, by a terminal, a downlink reference signal sent by an access network device; measuring, by the terminal, the downlink reference signal, to obtain a plurality of uplink precoding vectors; sending, by the terminal, SRSs to the access network device on a plurality of uplink SRS resources, where SRSs sent on different uplink SRS resources are precoded by using different uplink precoding vectors; receiving, by the terminal, uplink scheduling signaling sent by the access network device, where the uplink scheduling signaling is used to indicate a resource index of at least one uplink SRS resource.

9 Claims, 11 Drawing Sheets

(51) Int. Cl.

| | | |
|---|---|---|
| *H04B 7/0404* | (2017.01) | |
| *H04B 7/0456* | (2017.01) | |
| *H04B 7/06* | (2006.01) | |
| *H04B 1/713* | (2011.01) | |
| *H04W 72/04* | (2009.01) | |
| *H04W 72/12* | (2009.01) | |

(52) U.S. Cl.
CPC .......... *H04B 7/0456* (2013.01); *H04B 7/063* (2013.01); *H04B 7/0695* (2013.01); *H04L 5/005* (2013.01); *H04L 5/0007* (2013.01); *H04W 72/0413* (2013.01); *H04W 72/1268* (2013.01); *H04L 5/0051* (2013.01)

(56) References Cited

U.S. PATENT DOCUMENTS

| | | | | |
|---|---|---|---|---|
| 2011/0002415 | A1* | 1/2011 | Nakao | H04L 25/49 |
| 2011/0200143 | A1* | 8/2011 | Koo | H04L 27/04 |
| 2012/0069812 | A1* | 3/2012 | Noh | H04W 72/04 |
| 2012/0202555 | A1* | 8/2012 | Bergman | H04B 7/06 |
| 2012/0275411 | A1* | 11/2012 | Kim | H04W 72/04 |
| 2013/0028138 | A1 | 1/2013 | Hao et al. | |
| 2013/0322280 | A1 | 12/2013 | Pi | |
| 2013/0343340 | A1 | 12/2013 | Seo et al. | |
| 2014/0112168 | A1 | 4/2014 | Chen et al. | |
| 2015/0065153 | A1 | 3/2015 | Nissila et al. | |
| 2015/0085692 | A1 | 3/2015 | Wang et al. | |
| 2016/0056941 | A1 | 2/2016 | Kang et al. | |
| 2017/0150482 | A1 | 5/2017 | Chen et al. | |

FOREIGN PATENT DOCUMENTS

| | | |
|---|---|---|
| CN | 103095444 A | 5/2013 |
| CN | 103391625 A | 11/2013 |
| CN | 103634068 A | 3/2014 |
| CN | 104184537 A | 12/2014 |
| CN | 104350690 A | 2/2015 |
| CN | 104737489 A | 6/2015 |
| CN | 104754537 A | 7/2015 |
| CN | 105103466 A | 11/2015 |
| EP | 2426831 A1 | 3/2012 |
| JP | 2012506193 A | 3/2012 |
| RU | 2010105859 A | 8/2011 |
| WO | 2010107945 A2 | 9/2010 |
| WO | 2010124588 A1 | 11/2010 |
| WO | 2013068834 A1 | 5/2013 |
| WO | 2013183933 A1 | 12/2013 |
| WO | 2015035645 A1 | 3/2015 |
| WO | 2016114696 A1 | 7/2016 |

OTHER PUBLICATIONS

R1-164445 Qualcomm Incorporated,"Support of Periodic and/or Aperiodic SRS",3GPP TSG RAN WG1 Meeting #85, Nanjing, China May 23-27, 2016,total 2 pages.

3GPP TS 36.211 V13.2.0 (Jun. 2016),3rd Generation Partnership Project;Technical Specification Group Radio Access Network;Evolved Universal Terrestrial Radio Access (E-UTRA);Physical channels and modulation(Release 13),total 168 pages.

3GPP TS 36.212 V13.2.0 (Jun. 2016),3rd Generation Partnership Project;Technical Specification Group Radio Access Network;Evolved Universal Terrestrial Radio Access (E-UTRA);Multiplexing and channel coding(Release 13),total 140 pages.

Mitsubishi Electric, Performance Evaluation of Rank-1 Precoded SRS, 3GPP TSG-RAN WG1#58 R1-093150, 3GPP, Aug. 19, 2009 (Publication showing well-known technology).

3GPP TSG RAN WG1 Meeting #85,R1-164254,:"Views on NR MIMO design",CATT, Nanjing, China, May 23-27, 2016,total 4 pages.

Huawei, HiSilicon, "Discussion on NR UL MIMO", 3GPP TSG RAN WG1 Meeting #86 R1-167208, Gothenburg, Sweden Aug. 22-26, 2016, total 4 pages.

Zeng Zhaohua, "Basic Principles and Key Technologies of LTE", Xidian University Press, publication date May 2010, pp. 199-200, with an English abstract.

* cited by examiner

DATA SENDING METHOD, SIGNALING SENDING METHOD, APPARATUS, AND SYSTEM

CROSS-REFERENCE TO RELATED APPLICATIONS

This application is a continuation of International Application No. PCT/CN2017/097008, filed on Aug. 11, 2017, which claims priority to Chinese Patent Application No. 201610821803.2, filed on Aug. 12, 2016. The disclosures of the aforementioned applications are hereby incorporated by reference in their entireties.

TECHNICAL FIELD

Embodiments of this application relate to the communications field, and in particular, to a data sending method, a signaling sending method, an apparatus, and a system.

BACKGROUND

Since Long Term Evolution (LTE) Release 10, uplink transmission of a plurality of terminal-based transmit antennas is supported. During uplink multi-antenna transmission, a physical uplink shared channel (PUSCH for short) can support space transmission of as many as four layers through antenna precoding, to improve a data transmission rate and uplink spectrum efficiency that can be reached during uplink data transmission.

During multi-antenna transmission, user equipment (User Equipment) sends a sounding reference signal (SRS) to an evolved NodeB (evolutional Node B, eNB or e-NodeB); the eNB determines a suitable uplink transmission rank and a precoding matrix based on the SRS, where the precoding matrix is determined by the eNB based on a codebook, and the codebook is a predefined set of precoding matrices of a limited quantity; the eNB sends the uplink transmission rank and the precoding matrix to the UE in an uplink scheduling grant; and the UE performs layer mapping on uplink data based on the uplink transmission rank fed back by the eNB, precodes, by using a corresponding precoding vector in the precoding matrix, uplink data obtained after the layer mapping, and sends the precoded uplink data.

Because the eNB selects the precoding matrix from the preset codebook, the precoding matrix may not be suitable for an actual case of an uplink channel of the UE, causing relatively poor transmission performance of the uplink data.

SUMMARY

According to a first aspect, a data sending method is provided, where the method includes:

receiving, by a terminal, a downlink reference signal sent by an access network device;

measuring, by the terminal, the downlink reference signal, to obtain a plurality of uplink precoding vectors;

sending, by the terminal, sounding reference signals SRSs to the access network device on a plurality of uplink SRS resources, where SRSs sent on different uplink SRS resources are precoded by using different uplink precoding vectors;

receiving, by the terminal, uplink scheduling signaling sent by the access network device, where the uplink scheduling signaling is used to indicate a resource index of at least one uplink SRS resource; and precoding, by the terminal, uplink data by using an uplink precoding vector corresponding to the resource index, and sending the precoded uplink data to the access network device.

According to a second aspect, an uplink data receiving method is provided, where the method includes:

sending, by an access network device, a downlink reference signal to a terminal;

receiving, by the access network device, a sounding reference signal SRS that is sent by the terminal on at least one uplink SRS resource, where SRSs on different uplink SRS resources are precoded by using different uplink precoding vectors, and the uplink precoding vector is obtained by the terminal by measuring the downlink reference signal;

sending, by the access network device, uplink scheduling signaling to the terminal, where the uplink scheduling signaling is used to indicate a resource index of the at least one uplink SRS resource; and receiving, by the access network device, uplink data sent by the terminal, where the uplink data is data precoded by using an uplink precoding vector corresponding to the resource index.

In a possible design of the first aspect or the second aspect, different uplink SRS resources correspond to different SRS ports.

In a possible design of the first aspect or the second aspect, the uplink scheduling signaling is further used to indicate a modulation and coding scheme MCS used for the uplink data, and the MCS is an MCS of the uplink data that is precoded by using the uplink precoding vector corresponding to the resource index.

In a possible design of the first aspect or the second aspect, the uplink scheduling signaling is further used to indicate a precoding scheme used for the uplink data, and the precoding scheme is an open-loop precoding scheme or a closed-loop precoding scheme.

In a possible design of the first aspect or the second aspect, the open-loop precoding scheme is a scheme in which uplink data on different time-frequency resources is precoded by using different uplink precoding vectors in turn, where the different time-frequency resources include different physical resource blocks or different subcarriers or different orthogonal frequency-division multiplexing OFDM symbols.

In a possible design of the first aspect or the second aspect, the closed-loop precoding scheme is a scheme in which uplink data on a specified time-frequency resource is precoded by using a same uplink precoding vector.

In a possible design of the first aspect or the second aspect, the uplink scheduling signaling is further used to indicate a time-frequency resource used for the uplink data; and the time-frequency resource includes at least two subbands, and the uplink data sent on each subband is precoded by using an uplink precoding vector corresponding to an independent resource index; or the uplink data sent on a bandwidth of the time-frequency resource is precoded by using an uplink precoding vector corresponding to a same resource index.

In a possible design of the first aspect or the second aspect, the uplink scheduling signaling is further used to indicate a time-frequency resource used for the uplink data;

the time-frequency resource includes a first subband set and a second subband set;

the uplink scheduling signaling is further used to instruct to precode, by using the uplink precoding vector corresponding to the resource index, uplink data sent on the first subband set; and the uplink scheduling signaling is further used to instruct to precode, by using an uplink precoding vector determined based on a codebook, uplink data sent on the second subband set.

In a possible design of the first aspect or the second aspect, the terminal receives downlink configuration signaling sent by the access network device; or in other words, the access network device sends downlink configuration signaling to the terminal; and the downlink configuration signaling is used to configure a time-frequency resource of the downlink reference signal; or the downlink configuration signaling is used to configure a time-frequency resource of the downlink reference signal and a sequence resource of the SRS; or the downlink configuration signaling is used to configure a time-frequency resource of the downlink reference signal, a sequence resource of the SRS, and a code resource of the SRS; or the downlink configuration signaling is used to configure a time-frequency resource of the downlink reference signal, the uplink SRS resource, and a sequence resource of the SRS; or the downlink configuration signaling is used to configure a time-frequency resource of the downlink reference signal, the uplink SRS resource, a sequence resource of the SRS, and a code resource of the SRS.

In a possible design of the first aspect or the second aspect, a time domain resource occupied by the downlink configuration instruction and a time domain resource occupied by the downlink reference signal are in a same time unit, the time unit is a timeslot or a subframe or a transmission time interval, and the time unit includes n OFDM symbols;

the downlink configuration signaling occupies $0^{th}$ to $X1^{th}$ OFDM symbols of the time unit; and the downlink reference signal occupies $X2^{th}$ to $X3^{th}$ OFDM symbols of the time unit, where X1=1 or 2 or 3, X3=X2 or X2+1, and n−1>X3≥X2≥1.

In a possible design of the first aspect or the second aspect, a time domain resource occupied by the downlink configuration instruction, a time domain resource occupied by the downlink reference signal, and a time domain resource occupied by the SRS are in a same time unit, the time unit is a timeslot or a subframe or a transmission time interval, and the time unit includes n OFDM symbols;

the downlink configuration signaling occupies $0^{th}$ to $X1^{th}$ OFDM symbols of the time unit;

the downlink reference signal occupies $X2^{th}$ to $X3^{th}$ OFDM symbols of the time unit; and the SRS occupies $X4^{th}$ to $X5^{th}$ OFDM symbols of the time unit, where X1=1 or 2 or 3, X3=X2 or X2+1, and n−1≥X5≥X4≥X3+1.

In a possible design of the first aspect or the second aspect, a time domain resource occupied by the downlink configuration instruction, a time domain resource occupied by the downlink reference signal, a time domain resource occupied by the SRS, and the uplink scheduling signaling are in a same time unit, and the time unit includes n symbols;

the downlink configuration signaling occupies $0^{th}$ to $X1^{th}$ OFDM symbols of the time unit;

the downlink reference signal occupies $X2^{th}$ to $X3^{th}$ OFDM symbols of the time unit;

the SRS occupies $X4^{th}$ to $X5^{th}$ OFDM symbols of the time unit; and the uplink scheduling signaling occupies $Y6^{th}$ to $Y7^{th}$ symbols of the time unit, where X1=1 or 2 or 3, X3=X2 or X2+1, and n−1≥X7≥X6≥X5≥X4≥X3+1.

In a possible design of the first aspect or the second aspect, the uplink SRS resource occupies m frequency domain resources, and the SRS is transmitted in a frequency-hopping manner on the m frequency domain resources.

In a possible design of the first aspect or the second aspect, a frequency-domain bandwidth occupied by the time-frequency resource of the downlink reference signal is the same as a frequency-domain bandwidth occupied by the uplink SRS resource.

In a possible design of the first aspect or the second aspect, the downlink configuration instruction is used to configure an orthogonal frequency-division multiplexing OFDM symbol position and/or a physical resource block PRB position corresponding to the time-frequency resource of the downlink reference signal;

the OFDM symbol position includes a start symbol index and a total quantity of symbols occupied by the downlink reference signal, or the start symbol index and an end symbol index; and the PRB position includes indexes of PRBs, on all transmission bandwidths, occupied by the downlink reference signal, where the plurality of PRBs are nonconsecutive PRBs or consecutive PRBs.

In a possible design of the first aspect or the second aspect, the downlink configuration instruction is used to configure an orthogonal frequency-division multiplexing OFDM symbol position and/or a physical resource block PRB position corresponding to the uplink SRS resource;

the OFDM symbol position includes a start symbol index and a total quantity of symbols corresponding to the uplink SRS resource, or the start symbol index and an end symbol index; and the PRB position includes indexes of PRBs, on all transmission bandwidths, corresponding to the uplink SRS resource, the SRS is transmitted in a frequency-hopping manner on the transmission bandwidth, and the plurality of PRBs are nonconsecutive PRBs or consecutive PRBs, where the SRS occupies a same transmission bandwidth or different transmission bandwidths in each OFDM symbol.

According to a third aspect, a signaling receiving method is provided, where the method includes:

receiving, by a terminal, scheduling grant signaling sent by an access network device, where the scheduling grant signaling includes first-level control signaling and second-level control signaling;

the first-level control signaling is used to indicate common scheduling information in M transmission modes; and the second-level control signaling is used to indicate specific scheduling information in the M transmission modes, where M is an integer greater than or equal to 2.

According to a fourth aspect, a signaling sending method is provided, where the method includes:

receiving, by a terminal, scheduling grant signaling sent by an access network device, where the scheduling grant signaling includes first-level control signaling and second-level control signaling;

the first-level control signaling is used to indicate common scheduling information in M transmission modes; and the second-level control signaling is used to indicate specific scheduling information in the M transmission modes, where M is an integer greater than or equal to 2.

In a possible design of the third aspect or the fourth aspect, the M transmission modes include at least two of the following transmission modes:

a single-antenna transmission mode, a transmit diversity transmission mode, a codebook-based open-loop precoding scheme, a codebook-based closed-loop precoding scheme, a channel reciprocity-based open-loop precoding scheme, and a channel reciprocity-based closed-loop precoding scheme, where the codebook-based open-loop precoding scheme is a scheme in which uplink data on different time-frequency resources is precoded by using, in turn, precoding vectors in a codebook indicated by the access network device; the codebook-based closed-loop precoding scheme is a scheme in which uplink data on a specified time-frequency resource is precoded by using a precoding matrix in a codebook indicated by the access network device; the channel reciprocity-based open-loop precoding scheme is a scheme in which uplink data on different time-frequency resources is precoded by using, in turn, precoding vectors that are obtained through downlink channel measurement; and the channel reciprocity-based closed-loop precoding scheme is a scheme in which uplink data on a specified time-frequency resource is precoded by using a precoding vector that is obtained through downlink channel measurement.

In a possible design of the third aspect or the fourth aspect, the M transmission modes include at least two of the following transmission modes:

a single-antenna transmission mode, a transmit diversity transmission mode, an open-loop precoding scheme, and a closed-loop precoding scheme.

In a possible design of the third aspect or the fourth aspect, the first-level control signaling includes:

first scheduling resource indication information, and indication information of a transmission mode of the second-level control signaling; or first scheduling resource indication information, indication information of a transmission mode of the second-level control signaling, and a first MSC; or first scheduling resource indication information, indication information of a transmission mode of the second-level control signaling, a first MSC, and demodulation pilot port information; or first scheduling resource indication information, indication information of a transmission mode of the second-level control signaling, a first MSC, and first-level precoding matrix indication information; or first scheduling resource indication information, indication information of a transmission mode of the second-level control signaling, and first-level precoding matrix indication information; or first scheduling resource indication information, indication information of a transmission mode of the second-level control signaling, a first MSC, first-level precoding matrix indication information, a power control command, channel measurement triggering information, and SRS resource configuration information, where the first MCS is an MCS of a first transport block, or an MCS in an assumed first transmission mode.

In a possible design of the third aspect or the fourth aspect, the second-level control signaling includes:

second-level precoding matrix indication information; or a second MCS and second-level precoding matrix indication information; or a second MCS, second-level precoding matrix indication information, and the demodulation pilot port information; or the second MCS and the second-level precoding matrix indication information; or a second MCS, second-level precoding matrix indication information, and second scheduling resource indication information, where the second MCS is an MCS of a second transport block, or a differential MCS for the MCS in the first transmission mode relative to that in the transmission mode of the second-level control signaling; and the second scheduling resource indication information is used to indicate a resource in a time-frequency resource range indicated by the first scheduling resource indication information.

In a possible design of the third aspect or the fourth aspect, the method further includes:

determining, by the terminal, scheduling information of a data channel based on the first-level control signaling and the second-level control signaling.

In a possible design of the third aspect or the fourth aspect, the determining, by the terminal, scheduling information of a data channel based on the first-level control signaling and the second-level control signaling includes:

determining a first precoding matrix W1 in a double codebook structure based on the first-level precoding matrix indication information in the first-level control signaling;

determining a second precoding matrix W2 in the double codebook structure based on the second-level precoding matrix indication information in the second-level control signaling; and determining, based on the first precoding matrix W1 and the second precoding matrix W2, a precoding matrix used for data transmitted on the data channel.

In a possible design of the third aspect or the fourth aspect, the first-level precoding matrix indication information corresponds to a wideband, and the second-level precoding matrix indication information corresponds to a sub-band.

In a possible design of the third aspect or the fourth aspect, first-level precoding matrix indication information is indication information that remains valid before first precoding matrix indication information in a next piece of first-level control signaling is received; and second-level precoding matrix indication information is indication information that is valid during current scheduling.

In a possible design of the third aspect or the fourth aspect, the first-level control signaling and the second-level control signaling occupy different OFDM symbols in a same time unit;

the first-level control signaling occupies first n OFDM symbols in the time unit, where n is a positive integer; and the second-level control signaling occupies a data scheduling bandwidth in the time unit.

In a possible design of the third aspect or the fourth aspect, the first-level control signaling and the second-level control signaling occupy different time units.

In a possible design of the third aspect or the fourth aspect, two pieces of first-level control signaling respectively occupy an $i^{th}$ time unit and an $(i+j)^{th}$ time unit, and there is an $(i+k)^{th}$ time unit that is occupied by at least two pieces of second-level control signaling, where $0 \leq k \leq j$, and i, j, and k are all integers.

In a possible design of the third aspect or the fourth aspect, the second-level control signaling is used jointly with most recent first-level control signaling that is sent before the second-level control signaling, to determine the scheduling information of the data channel.

In a possible design of the third aspect or the fourth aspect, the first-level control signal is further used to indicate a time-frequency position of the second-level control signaling.

In a possible design of the third aspect or the fourth aspect, there is at least one transmission mode, in the M transmission modes, that corresponds only to the first-level control signaling.

According to a fifth aspect, an embodiment of this application provides a data sending apparatus, where the uplink data sending includes at least one unit, and the at least one unit is configured to implement the data sending method provided in the first aspect or any possible design of the first aspect.

According to a sixth aspect, an embodiment of this application provides a data receiving apparatus, where the data receiving apparatus includes at least one unit, and the at least one unit is configured to implement the uplink data receiving method provided in the second aspect or any possible design of the second aspect.

According to a seventh aspect, an embodiment of this application provides a signaling receiving apparatus, where the signaling receiving apparatus includes at least one unit, and the at least one unit is configured to implement the signaling receiving method provided in the third aspect or any possible design of the third aspect.

According to an eighth aspect, an embodiment of this application provides a signaling sending apparatus, where the signaling sending apparatus includes at least one unit, and the at least one unit is configured to implement the signaling sending method provided in the fourth aspect or any possible design of the fourth aspect.

According to a ninth aspect, an embodiment of this application provides a terminal, where the terminal includes a processor and a memory; the memory is configured to store one or more instructions, and the instructions are instructed to be executed by the processor; and the processor is configured to implement the data sending method provided in the first aspect or any possible design of the first aspect; or the processor is configured to implement the signaling receiving method provided in the third aspect or any possible design of the third aspect.

According to a tenth aspect, an embodiment of this application provides an access network device, where the access network device includes a processor and a memory; the processor is configured to store one or more instructions, and the instructions are instructed to be executed by the processor; and the processor is configured to implement the data sending method provided in the second aspect or any possible design of the second aspect; or the processor is configured to implement the signaling sending method provided in the fourth aspect or any possible design of the fourth aspect.

According to an eleventh aspect, an embodiment of this application provides a computer-readable storage medium, where the computer-readable storage medium stores an executable program used to implement the data sending method provided in the first aspect or any possible design of the first aspect.

According to a twelfth aspect, an embodiment of this application provides a computer-readable storage medium, where the computer-readable storage medium stores an executable program used to implement the uplink data receiving method provided in the second aspect or any possible design of the second aspect.

According to a thirteenth aspect, an embodiment of this application provides a computer-readable storage medium, where the computer-readable storage medium stores an executable program used to implement the signaling receiving method provided in the third aspect or any possible design of the third aspect.

According to a fourteenth aspect, an embodiment of this application provides a computer-readable storage medium, where the computer-readable storage medium stores an executable program used to implement the signaling sending method provided in the fourth aspect or any possible design of the fourth aspect.

According to a fifteenth aspect, an embodiment of this application provides an uplink data sending system, where the uplink data sending system includes a terminal and an access network device, the terminal includes the data sending apparatus provided in the fifth aspect or any possible design of the fifth aspect, and the access network device includes the data receiving apparatus provided in the sixth aspect or any possible design of the sixth aspect.

According to a sixteenth aspect, an embodiment of this application provides an uplink data sending system, where the uplink data sending system includes a terminal and an access network device, the terminal is the terminal provided in the ninth aspect or any possible design of the ninth aspect, and the access network device is the access network device provided in the tenth aspect or any possible design of the tenth aspect.

According to a seventeenth aspect, an embodiment of this application provides a signaling sending system, where the uplink data sending system includes a terminal and an access network device, the terminal includes the signaling receiving apparatus provided in the seventh aspect or any possible design of the seventh aspect, and the access network device includes the signaling sending apparatus provided in the eighth aspect or any possible design of the eighth aspect.

According to an eighteenth aspect, an embodiment of this application provides a signaling sending system, where the uplink data sending system includes a terminal and an access network device, the terminal is the terminal provided in the ninth aspect or any possible design of the ninth aspect, and the access network device is the access network device provided in the tenth aspect or any possible design of the tenth aspect.

The technical solutions provided in the embodiments of this application have the following beneficial effects:

The uplink precoding vector indicated by the access network device to the terminal is a part of the plurality of uplink precoding vectors obtained by the terminal by measuring the downlink reference signal. This resolves a problem of relatively poor transmission performance of uplink data caused by that a precoding matrix selected by the access network device from a preset codebook may not be suitable for an actual case of an uplink channel of the terminal. The precoding vector used by the terminal is a precoding vector obtained by the terminal by measuring the downlink reference signal. Therefore, based on a channel reciprocity principle, the precoding vector is more suitable for the actual case of the uplink channel of the terminal, so that the transmission performance of the uplink data can be improved.

DESCRIPTION OF EMBODIMENTS

To make the objectives, technical solutions, and advantages of this application clearer, the following further describes the implementations of this application in detail with reference to the accompanying drawings.

A "module" mentioned in this specification is a program or an instruction that is stored in a memory and can implement some functions. A "unit" mentioned in this specification is a functional structure divided based on logic. The "unit" may be implemented by only hardware, or implemented by a combination of software and hardware.

"A plurality of" in this specification means two or more than two. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

Figure 1:
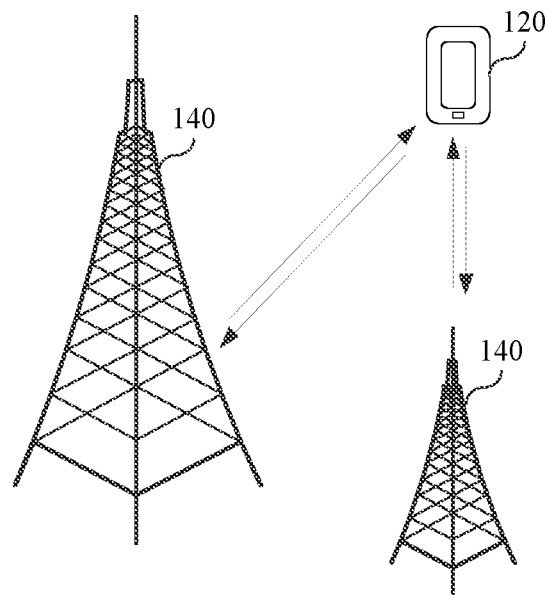
FIG. 1 is a schematic structural diagram of a communications system according to an embodiment of this application.

FIG. 1 is a schematic structural diagram of a communications system 100 according to an embodiment of this application. The communications system 100 may be an LTE system or a 5G system. The communications system 100 includes at least one terminal 120 and at least one access network device 140.

The terminal 120 may be a device such as a personal communication service (PCS) phone, a cordless telephone set, a Session Initiation Protocol (SIP) phone, a wireless local loop (WLL) station, or a personal digital assistant (PDA). The terminal may also be referred to as a system, a subscriber unit (Subscriber Unit), a subscriber station (Subscriber Station), a mobile station (Mobile Station), a mobile (Mobile), a remote station (Remote Station), an access point (Access Point), a remote terminal (Remote Terminal), an access terminal (Access Terminal), a user terminal (User Terminal), a user agent (User Agent), a user device (User Device), or user equipment (User Equipment).

The terminal 120 communicates with one or more access network devices 140 by using a radio access network (RAN).

The access network device 140 may be a base station, and serve as a router between the terminal 120 and a remaining part of the access network, where the remaining part of the access network may include an Internet Protocol (IP) network. The base station may further coordinate attribute management of an air interface. For example, the base station may be a base transceiver station (BTS) in GSM or CDMA, or may be a NodeB (NodeB) in WCDMA, or may be an evolved NodeB (eNB or e-NodeB, evolved NodeB) in LTE. This is not limited in this application. The following embodiments are described by using an example in which the access network device 140 is an eNB.

Figure 2:
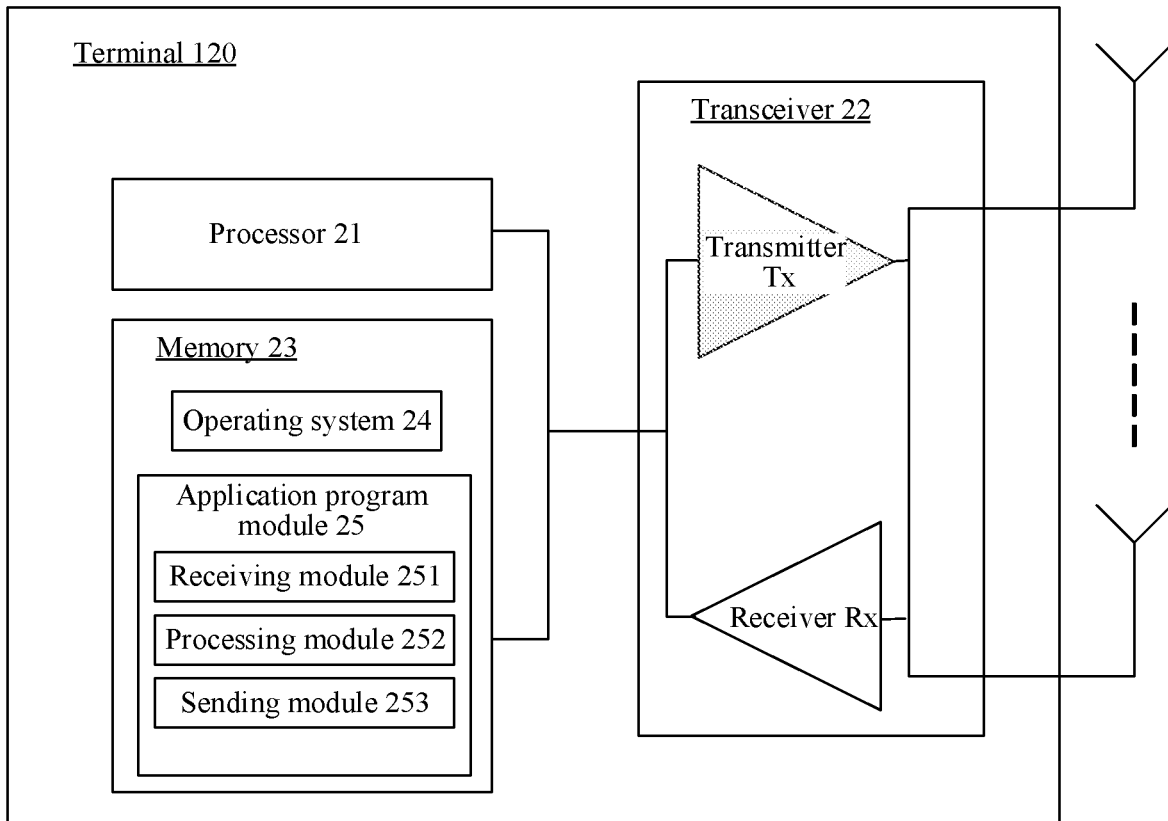
FIG. 2 is a schematic structural diagram of a terminal according to an embodiment of this application.

FIG. 2 is a schematic block diagram of a terminal 120 according to an embodiment of this application. The terminal 120 includes a processor 21, a transceiver 22, and a memory 23.

The processor 21 includes one or more processing cores, and the processor 21 performs various functional applications and information processing by running a software program and a module.

The transceiver 22 includes a receiver Rx and a transmitter Tx, and the transceiver 22 may further be implemented as a communications chip. The communications chip may include a receiving module, a transmitting module, a modem module, and the like, and is configured to modulate and demodulate information and receive or send the information by using a radio signal. Optionally, the transceiver 22 has a plurality of antennas, and can implement multi-antenna sending or multi-antenna receiving by using the plurality of antennas.

The memory 23 is connected to the processor 21.

The memory 23 may be configured to store a software program and a module. The memory may store an operating system 24 and an application program module 25 that corresponds to at least one function.

The application program module 25 includes at least: a receiving module 251 configured to receive information, a processing module 252 configured to process information, and a sending module 253 configured to send information.

The receiving module 251 is configured to receive a downlink reference signal sent by an access network device. The processing module 252 is configured to measure the downlink reference signal, to obtain a plurality of uplink precoding vectors. The sending module 253 sends sounding reference signals (SRS) SRSs to the access network device on a plurality of uplink SRS resources, where SRSs sent on different uplink SRS resources are precoded by using different uplink precoding vectors. The receiving module 251 is configured to receive uplink scheduling signaling sent by the access network device, where the uplink scheduling signaling is used to indicate a resource index of at least one of the uplink SRS resources. The processing module 252 is configured to precode uplink data by using an uplink precoding vector corresponding to the resource index. The sending module 253 is configured to send the precoded uplink data to the access network device.

Optionally, the processor 21 is configured to execute each module in the application program module 25, to implement steps that need to be performed by a terminal in the following embodiments shown in FIG. 4, FIG. 5, FIG. 10, or FIG. 11.

In addition, the memory 23 is a computer-readable storage medium, and may be implemented by any type of volatile or nonvolatile storage device or a combination thereof, such as a static random access memory (SRAM), an electrically erasable programmable read only memory (EEPROM), an erasable programmable read only memory (EPROM), a programmable read only memory (PROM), a read-only memory (ROM), a magnetic memory, a flash memory, or a magnetic disk or an optical disk. The memory 23 stores at least one instruction. When the processor 21 executes the at least one instruction, steps corresponding to a terminal 120 in the following method embodiment are implemented.

Persons skilled in the art may understand that, a structure of the terminal 120 shown in FIG. 2 does not constitute a limitation on the access network device, and may include components more or fewer than those shown in the figure, or a combination of some components, or components disposed differently.

Figure 3:
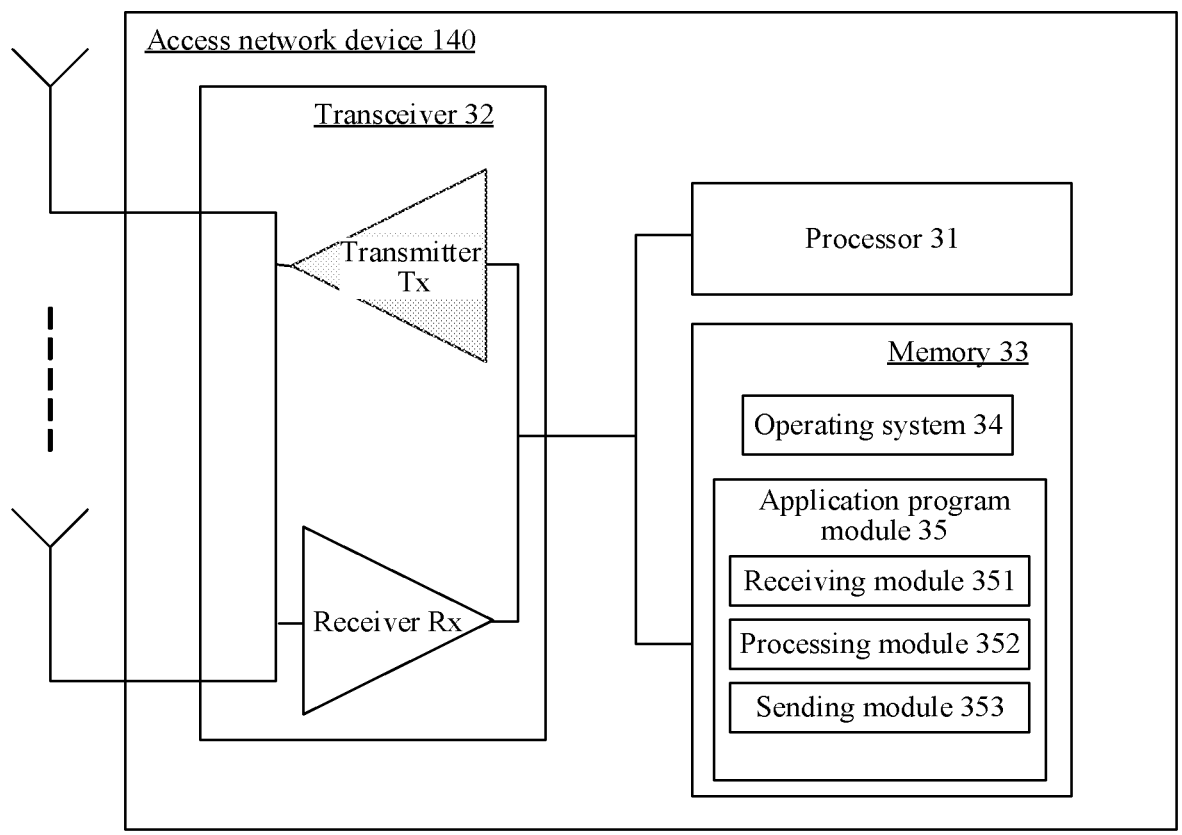
FIG. 3 is a schematic structural diagram of an access network device according to an embodiment of this application.

FIG. 3 is a schematic block diagram of an access network device 140 according to an embodiment of this application. The access network device includes a processor 31, a transceiver 32, and a memory 33.

The processor 31 includes one or more processing cores, and the processor 31 performs various functional applications and information processing by running a software program and a module.

The transceiver 32 includes a receiver Rx and a transmitter Tx, and the transceiver 32 may further be implemented as a communications chip. The communications chip may include a receiving module, a transmitting module, a modem module, and the like, and is configured to modulate and demodulate information and receive or send the information by using a radio signal. Optionally, the transceiver 32 has a plurality of antennas, and can implement multi-antenna sending or multi-antenna receiving by using the plurality of antennas.

The memory 33 is connected to the processor 31.

The memory 33 may be configured to store a software program and a module. The memory may store an operating system 34 and an application program module 35 that corresponds to at least one function.

The application program module 35 includes at least: a receiving module 351 configured to receive information, a processing module 352 configured to process information, and a sending module 353 configured to send information.

The sending module 353 is configured to send a downlink reference signal to a terminal. The receiving module 351 is configured to receive SRSs sent by the terminal on at least one uplink SRS resource, where SRSs sent on different uplink SRS resources are precoded by using different uplink precoding vectors, and the uplink precoding vectors are obtained by the terminal by measuring the downlink reference signal. The sending module 353 is configured to send uplink scheduling signaling to the terminal, where the uplink scheduling signaling is used to indicate a resource index of the at least one uplink SRS resource. The receiving module 351 is configured to receive uplink data sent by the terminal, where the uplink data is data precoded by using an uplink precoding vector corresponding to the resource index.

Optionally, the processor 31 is configured to execute each module in the application program module 35, to implement steps that need to be performed by an access network device in the following embodiments shown in FIG. 4, FIG. 5, FIG. 10, or FIG. 11.

In addition, the memory 33 is a computer-readable storage medium, and may be implemented by any type of volatile or nonvolatile storage device or a combination thereof, such as a static random access memory (SRAM), an electrically erasable programmable read only memory (EEPROM), an erasable programmable read only memory (EPROM), a programmable read only memory (PROM), a read-only memory (ROM), a magnetic memory, a flash memory, or a magnetic disk or an optical disk. The memory 33 stores at least one instruction. When the processor 31 executes the at least one instruction, steps corresponding to an access network device 140 in the following method embodiment are implemented.

Persons skilled in the art may understand that, a structure of the access network device 140 shown in FIG. 3 does not constitute a limitation on the access network device, and may include components more or fewer than those shown in the figure, or a combination of some components, or components disposed differently.

Figure 4:
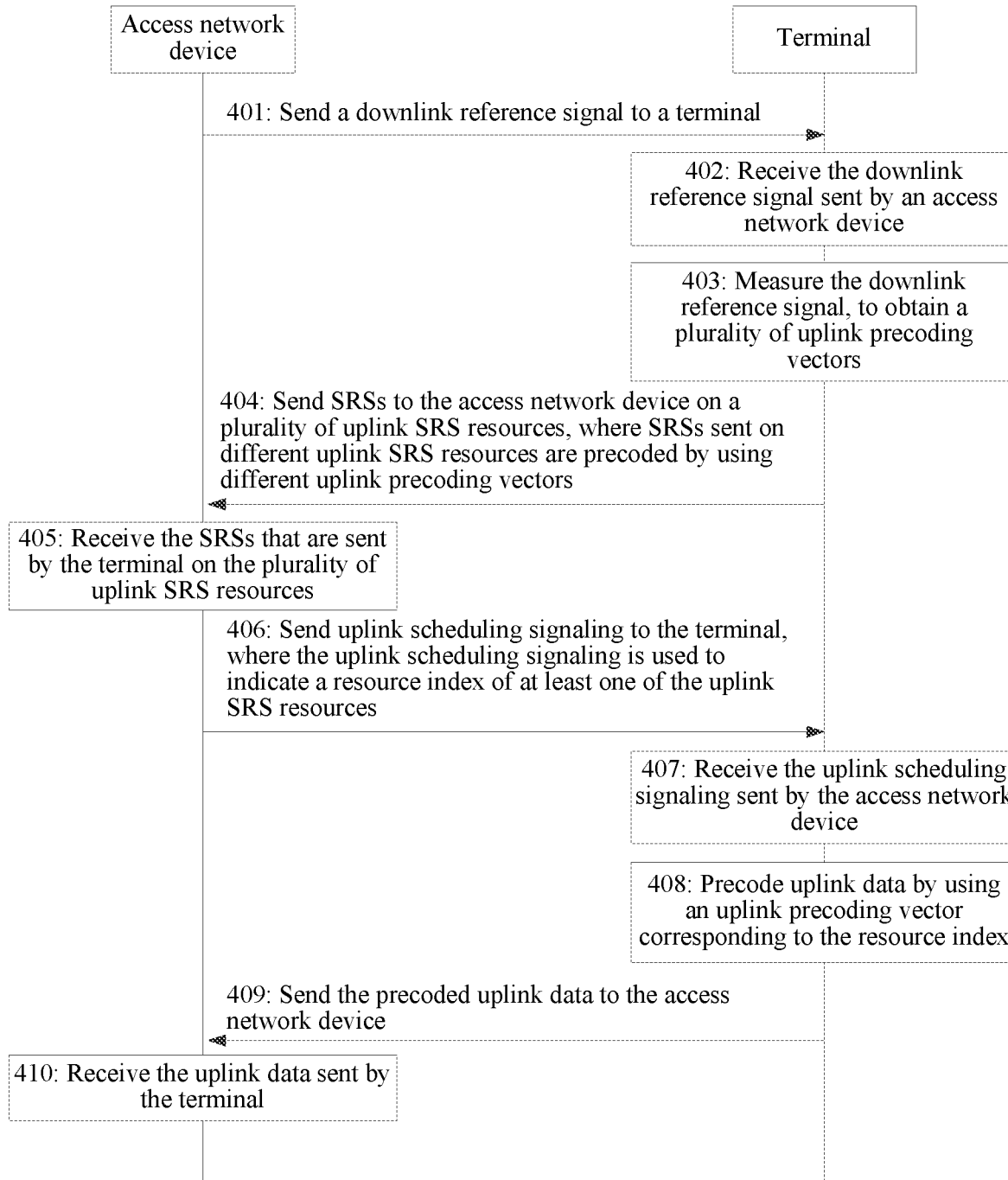
FIG. 4 is a method flowchart of a data sending method according to an embodiment of this application.

FIG. 4 is a flowchart of a data sending method according to an embodiment of this application. This embodiment is described by using an example in which the data sending method is applied to the communications system shown in FIG. 1. The method includes the following steps.

Step 401: An access network device sends a downlink reference signal to a terminal.

Optionally, the downlink reference signal is a cell-specific reference signal (CRS), or a demodulation reference signal (DM-RS), or a channel state information-reference signal (CSI-RS), or another reference signal that can be used for downlink channel estimation.

Step 402: The terminal receives the downlink reference signal sent by the access network device.

Step 403: The terminal measures the downlink reference signal, to obtain a plurality of uplink precoding vectors.

Step 404: The terminal sends SRSs to the access network device on a plurality of uplink SRS resources, where SRSs sent on different uplink SRS resources are precoded by using different uplink precoding vectors.

Step 405: The access network device receives the SRSs that are sent by the terminal on the plurality of uplink SRS resources.

Step 406: The access network device sends uplink scheduling signaling to the terminal, where the uplink scheduling signaling is used to indicate a resource index of at least one of the uplink SRS resources.

Step 407: The terminal receives the uplink scheduling signaling sent by the access network device.

Step 408: The terminal precodes uplink data by using an uplink precoding vector corresponding to the resource index.

Optionally, the uplink precoding vector corresponding to the resource index is a part of the plurality of uplink precoding vectors that are obtained by the terminal by measuring the downlink reference signal.

Optionally, the uplink data is data transmitted on a physical uplink shared channel (Physical Uplink Shared Channel, PUSCH).

Step 409: The terminal sends the precoded uplink data to the access network device.

Step 410: The access network device receives the uplink data sent by the terminal.

In conclusion, in the data sending method provided in this embodiment, the uplink precoding vector indicated by the access network device to the terminal is a part of the plurality of uplink precoding vectors obtained by the terminal by measuring the downlink reference signal. This resolves a problem of relatively poor transmission performance of uplink data caused by that a precoding matrix selected by the access network device from a preset codebook may not be suitable for an actual case of an uplink channel of the terminal. The precoding vector used by the terminal is a precoding vector obtained by the terminal by measuring the downlink reference signal. Therefore, based on a channel reciprocity principle, the precoding vector is more suitable for the actual case of the uplink channel of the terminal, so that the transmission performance of the uplink data can be improved.

Figure 5:
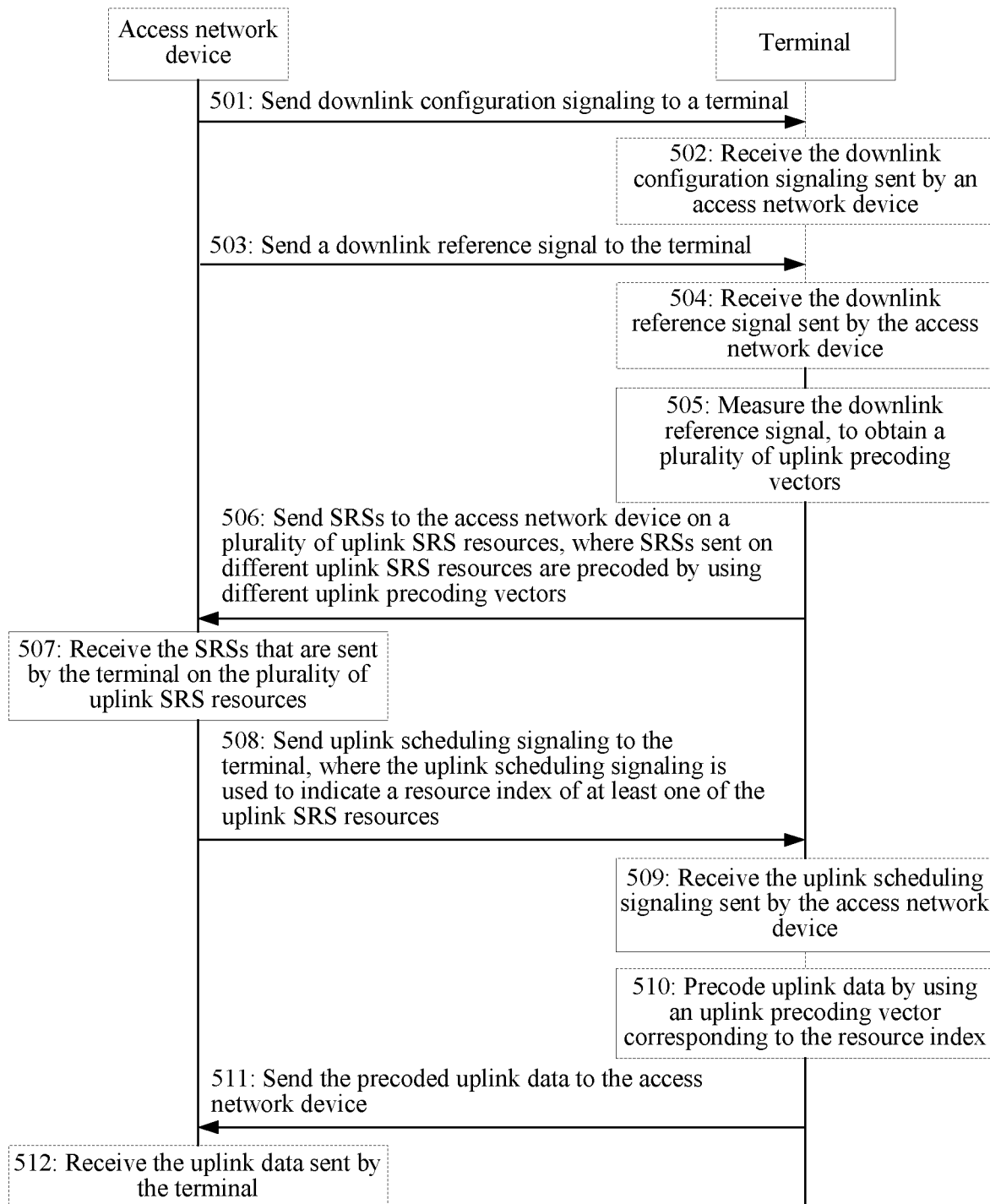
FIG. 5 is a method flowchart of a data sending method according to another embodiment of this application.

FIG. 5 is a flowchart of a data sending method according to another embodiment of this application. This embodiment is described by using an example in which the data sending method is applied to the communications system shown in FIG. 1. The method includes the following steps.

Step 501: An access network device sends downlink configuration signaling to a terminal.

The downlink configuration signaling is used to configure a time-frequency resource of a downlink reference signal, where the time-frequency resource is a time-frequency resource used to transmit a downlink reference signal. In the time-frequency resource of the downlink reference signal, a time domain resource includes an index of an orthogonal frequency-division multiplexing (OFDM) symbol occupied by the downlink reference signal, and a frequency domain resource occupied by the downlink reference signal includes an index of a physical resource block (PRB).

Optionally, the downlink configuration instruction is further used to configure an uplink SRS resource, where the uplink SRS resource is a resource used to transmit an SRS. In the uplink SRS resource, a time domain resource includes an OFDM symbol occupied by the SRS, and a frequency domain resource includes a PRB occupied by the SRS.

Optionally, the downlink configuration instruction is further used to configure a sequence resource required for generating an SRS, or a sequence resource and a code resource that are required for generating an SRS. The sequence resource is a base sequence number of a Zadoff-Chu sequence. The code resource is a quantity of cyclic shifts performed on the Zadoff-Chu sequence, and/or the code resource is an index of an orthogonal spreading code of the Zadoff-Chu sequence.

Step 502: The terminal receives the downlink configuration signaling sent by the access network device.

The terminal determines the time-frequency resource of the downlink reference signal based on the downlink configuration signaling.

Optionally, the terminal further determines an uplink SRS resource based on the downlink configuration signaling.

Optionally, there are at least two uplink SRS resources, and different uplink SRS resources correspond to different uplink ports.

Optionally, the terminal further determines, based on the downlink configuration signaling, a sequence resource that is used to generate the SRS, or a sequence resource and the code resource that are used to generate the SRS.

Step 503: The access network device sends a downlink reference signal to the terminal.

Optionally, the access network device sends the downlink reference signal on the time-frequency resource configured by the downlink configuration signaling.

Optionally, the downlink reference signal is a CRS, a DMRS, a CSI-RS, or another reference signal that can be used for downlink channel estimation.

Step 504: The terminal receives the downlink reference signal sent by the access network device.

Optionally, the terminal receives the downlink reference signal on the time-frequency resource configured by the downlink configuration signaling.

Step 505: The terminal measures the downlink reference signal, to obtain a plurality of uplink precoding vectors.

1. The terminal obtains a received signal matrix of the downlink reference signal on the time-frequency resource through measurement.

It is assumed that the received signal matrix of the downlink reference signal is YN*M, and a dimension of YN*M is N rows and M columns, where N is a quantity of receive antennas of the terminal, and M is a quantity of transmit antennas of the access network device. Then, $$YN*M = HS + I,$$

where H is a downlink channel from the access network device to the terminal, S is signal information sent by the access network device to the terminal, and I is interference information. Optionally, the interference information is sum information of interference and noise. Optionally, S is represented by using a signal whose power is normalized to 1.

2. The terminal calculates a channel estimation matrix $\hat{H}$ of a downlink channel based on a preset channel estimation algorithm and the received signal matrix.

The terminal performs channel estimation on the downlink reference signal based on the preset channel estimation algorithm, to calculate the channel estimation matrix $\hat{H}$ of the downlink channel. The preset channel estimation algorithm includes but is not limited to at least one of least-square (Least-Square) channel estimation, minimum mean square error (MMSE) channel estimation, and Wiener channel estimation.

$$\hat{H} = \begin{bmatrix} h_{00} & h_{01} & \ldots & h_{0M-1} \\ h_{10} & \vdots & \vdots & \vdots \\ \vdots & \vdots & \vdots & \vdots \\ h_{N-10} & \ldots & \ldots & h_{N-1M-1} \end{bmatrix}$$

3. The terminal transposes the channel estimation matrix $\hat{H}$ of the downlink channel, to obtain a channel estimation matrix $\hat{H}\_UL$ of an uplink channel.

In LTE or 5G, a same frequency bandwidth is used for uplink transmission and downlink transmission. When an uplink sending time interval and a downlink sending time interval are sufficiently short, it may be considered that fading of an uplink channel and fading of a downlink channel are basically the same, that is, the uplink channel and the downlink channel have channel reciprocity.

Based on the channel reciprocity, the terminal obtains the channel estimation matrix $\hat{H}\_UL=(\hat{H})^T$ of the uplink channel. $(\hat{H})^T$ is transposition of the channel estimation matrix $\hat{H}$ of the downlink channel.

4. The terminal performs singular value decomposition (SVD) on the channel estimation matrix $\hat{H}\_UL$ of the uplink channel, to obtain a precoding matrix.

For example, the terminal performs the SVD decomposition (or another matrix decomposition method) on $\hat{H}\_UL$, to obtain:

$$\hat{H}\_UL = U \sum V^H$$

$$V = [v_0 \ v_1 \ \ldots \ v_{r-1}] = \begin{bmatrix} v_{0,0} & v_{0,1} & v_{0,r-1} \\ v_{1,0} & \cdots & \vdots \\ \vdots & \vdots & \vdots \\ v_{N-1,0} & v_{N-1,1} & v_{N-1,r-1} \end{bmatrix}$$

where U is a unitary matrix, $\Sigma$ is a semidefinite diagonal matrix, and VH is a conjugate transpose matrix of V. A dimension of V is an N-row and r-column matrix. M, N, and r are all positive integers.

For example, V is a precoding matrix, and each column of matrix elements in V is a precoding vector. A dimension of each precoding vector is N, that is, a quantity of transmit antennas of the terminal.

Step 506: The terminal sends SRSs to the access network device on a plurality of uplink SRS resources, where SRSs sent on different uplink SRS resources are precoded by using different uplink precoding vectors.

1. The terminal generates SRSs based on the sequence resource and/or the code resource indicated by the downlink configuration signaling.

Optionally, the terminal generates SRSs based on the sequence resource configured by the downlink configuration signaling.

Optionally, the terminal generates SRSs based on the sequence resource and the code resource that are configured by the downlink configuration signaling. That is, the terminal determines the Zadoff-Chu sequence based on the base sequence number in the sequence resource, and performs a cyclic shift on the Zadoff-Chu sequence based on a cyclic shift value indicated by the code resource, to obtain the SRSs.

For example, the terminal obtains four SRSs by performing different cyclic shifts on a same Zadoff-Chu sequence.

2. The terminal determines a plurality of uplink SRS resources based on the downlink configuration signaling, where different uplink SRS resources correspond to different uplink ports.

For example, there are four uplink SRS resources. The terminal determines the four uplink SRS resources based on the downlink configuration signaling, where a first uplink SRS resource corresponds to an uplink port port 0, a second uplink SRS resource corresponds to an uplink port port 1, a third uplink SRS resource corresponds to an uplink port port 2, and a fourth uplink SRS resource corresponds to an uplink port port 3

3. The terminal precodes the SRSs by using the precoding vector, where SRSs on the different uplink SRS resources are precoded by using different precoding vectors.

For example, the terminal selects four precoding vectors from all of r precoding vectors in a precoding matrix V. A first SRS on the first uplink SRS resource is precoded by using a first precoding vector, a second SRS on the second uplink SRS resource is precoded by using a second precoding vector, a third SRS on the third uplink SRS resource is precoded by using a third precoding vector, and a fourth SRS on the fourth uplink SRS resource is precoded by using a fourth precoding vector.

4. The terminal sends the precoded SRSs on the plurality of uplink SRS resources.

For example, the terminal sends the first SRS on the first uplink SRS resource (the uplink port port 0), sends the second SRS on the second uplink SRS resource (the uplink port port 1), sends the third SRS on the third uplink SRS resource (the uplink port port 2), and sends the fourth SRS on the fourth uplink SRS resource (the uplink port port 3).

Step 507: The access network device receives the SRSs that are sent by the terminal on the plurality of uplink SRS resources.

For example, the access network device receives the first SRS on the first uplink SRS resource (the uplink port port 0), receives the second SRS on the second uplink SRS resource (the uplink port port 1), receives the third SRS on the third uplink SRS resource (the uplink port port 2), and receives the fourth SRS on the fourth uplink SRS resource (the uplink port port 3).

Step 508: The access network device sends uplink scheduling signaling to the terminal, where the uplink scheduling signaling is used to indicate a resource index of at least one of the uplink SRS resources.

Optionally, the step includes the following steps.

1. The access network device selects resource indexes of some of the uplink SRS resources based on a preset policy.

Optionally, the access network device determines, based on signal quality of the received SRSs, an SRS having optimal signal quality, and selects a resource index of an uplink SRS resource corresponding to the SRS having optimal signal quality. For example, the SRS on the uplink port port 0 has optimal signal quality, and the uplink port port 0 is selected as the resource index.

Optionally, the access network device determines, based on signal quality of the received SRSs, an SRS suitable for performing pairing transmission with another terminal, and selects a resource index of an uplink SRS resource corresponding to the SRS having relatively good performance in coordinated transmission with the another terminal. For example, the SRS on the uplink port port 1 is suitable for performing multiuser pairing with another terminal, and the uplink port port 1 is selected as the resource index.

Optionally, the access network device determines SRSs ranking on first n uplink ports, and selects resource indexes of uplink SRS resources corresponding to the SRSs on the first n uplink ports.

It should be noted that, a determining manner used by the access network device is not limited in this embodiment. The resource indexes that are of the uplink SRS resources and that are determined by the access network device are resource indexes of some or all of the uplink SRS resources used by the terminal when the terminal sends the SRSs.

Optionally, the resource index of the uplink SRS resource is represented by using a port index of an uplink port, or the resource index of the uplink SRS resource is represented by using a transmission rank (rank). There is a preset correspondence between the transmission rank and the port index.

For example, the correspondence between the transmission rank and the port index of the uplink port is shown in Table 1 below.

TABLE 1

| Transmission rank | Port index of an uplink index |
|---|---|
| 1 | port 0 |
| 2 | port 0, port 1 |
| 3 | port 0, port 1, port 2 |
| 4 | port 0, port 1, port 2, port 3 |

Alternatively, the resource index of the uplink SRS resource may be represented in another manner. This is not limited in this embodiment.

2. The access network device generates uplink scheduling signaling, where the uplink scheduling signaling is used to indicate a resource index of at least one of the uplink SRS resources.

The uplink scheduling signaling is also referred to as an uplink scheduling grant (Up Link grant, UL grant). The uplink scheduling signaling is used to configure a time-frequency resource of a PUSCH for the terminal, that is, a time-frequency resource used to transmit uplink data.

In this embodiment of this application, in addition to indicating the time-frequency resource of the PUSCH, the uplink scheduling signaling further carries the resource index of at least one uplink SRS resource. The resource index is used to instruct the terminal to precode the uplink data by using an uplink precoding vector corresponding to the resource index.

3. The access network device sends the uplink scheduling signaling to the terminal.

Step 509: The terminal receives the uplink scheduling signaling sent by the access network device.

Optionally, the terminal determines the time-frequency resource of the PUSCH based on the uplink scheduling signaling, that is, the time-frequency resource used to transmit the uplink data.

Step 510: The terminal precodes uplink data by using an uplink precoding vector corresponding to the resource index.

Optionally, the uplink precoding vector corresponding to the resource index is a part of the plurality of uplink precoding vectors that are obtained by the terminal by measuring the downlink reference signal.

Optionally, the step includes the following steps.

1. The terminal determines the resource index of the uplink SRS resource based on the uplink scheduling signaling, where the uplink SRS resource corresponding to the resource index is some or all of the uplink SRS resources used by the terminal in step 506.

2. The terminal determines, based on the resource index of the uplink SRS resource, the uplink precoding vector corresponding to the resource index.

When the resource index is represented by using a port index of an uplink port, the terminal determines an uplink precoding vector corresponding to the port index. When the resource index is represented by using a transmission rank, the terminal determines, based on a preset correspondence (for example, as shown in Table 1), an uplink precoding vector corresponding to the transmission rank.

3. The terminal precodes the uplink data by using the determined uplink precoding vector corresponding to the resource index.

For example, if the resource index of the uplink SRS resource is the port 0, the terminal precodes the uplink data by using the first uplink precoding vector corresponding to the port 0.

Step 511: The terminal sends the precoded uplink data to the access network device.

Optionally, the terminal sends the precoded uplink data to the access network device based on the time-frequency resource indicated by the uplink scheduling signaling.

Step 512: The access network device receives the uplink data sent by the terminal.

The access network device receives, on the time-frequency resource indicated by the uplink scheduling signaling, the uplink data sent by the terminal.

In conclusion, in the data sending method provided in this embodiment, the uplink precoding vector indicated by the access network device to the terminal is a part of the plurality of uplink precoding vectors obtained by the terminal by measuring the downlink reference signal. This resolves a problem of relatively poor transmission performance of uplink data caused by that a precoding matrix selected by the access network device from a preset codebook may not be suitable for an actual case of an uplink channel of the terminal. The precoding vector used by the terminal is a precoding vector obtained by the terminal by measuring the downlink reference signal. Therefore, based on a channel reciprocity principle, the precoding vector is more suitable for the actual case of the uplink channel of the terminal, so that the transmission performance of the uplink data can be improved.

In an optional embodiment based on the embodiment shown in FIG. 5, the uplink scheduling signaling is further used to indicate a modulation and coding scheme (MCS) used for the uplink data. The MCS is an MCS of the uplink data that is precoded by using the uplink precoding vector corresponding to the resource index. Optionally, step 510 includes the following steps.

1. The terminal determines the resource index and an MCS of the uplink SRS resource based on the uplink scheduling signaling, where the uplink SRS resource corresponding to the resource index is some or all of the uplink SRS resources used by the terminal in step 506.

2. The terminal performs channel coding and modulation on the uplink data based on the MCS.

3. The terminal determines, based on the resource index of the uplink SRS resource, the uplink precoding vector corresponding to the resource index.

When the resource index is represented by using a port index of an uplink port, the terminal determines an uplink precoding vector corresponding to the port index. When the resource index is represented by using a transmission rank, the terminal determines, based on a preset correspondence (for example, as shown in Table 1), an uplink precoding vector corresponding to the transmission rank.

4. The terminal precodes the uplink data by using the determined uplink precoding vector corresponding to the resource index.

The uplink data is uplink data obtained after the channel coding and modulation in step 2. The terminal precodes the uplink data by using the determined uplink precoding vector corresponding to the resource index.

For example, if the resource index of the uplink SRS resource is the port 0, the terminal precodes the uplink data by using the first uplink precoding vector corresponding to the port 0.

In an optional embodiment based on the embodiment shown in FIG. 5, the uplink scheduling signaling is further used to indicate a precoding scheme used for the uplink data, and the precoding scheme is an open-loop precoding scheme or a closed-loop precoding scheme.

The open-loop precoding scheme is a scheme in which the terminal precodes uplink data on different time-frequency resources by using different uplink precoding vectors in turn, where the different time-frequency resources include different physical resource blocks, different subcarriers, or different OFDM symbols.

Figure 6A:
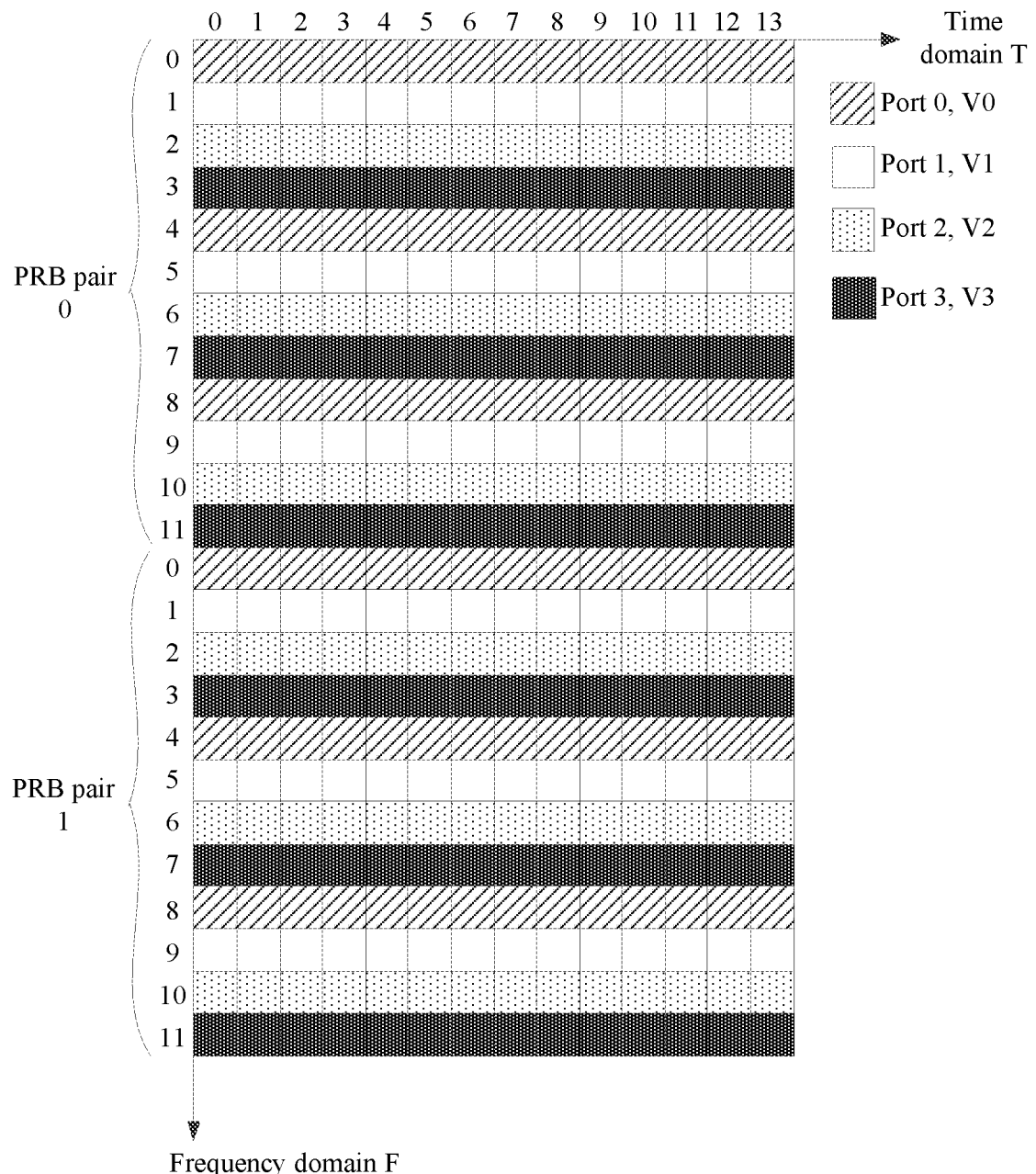
FIG. 6A is a schematic diagram of a principle of performing open-loop precoding on data according to an embodiment of this application.

For example, referring to FIG. 6A, a time-frequency resource used to transmit the uplink data occupies 14 OFDM symbols in total in time domain T, namely, $0^{th}$ to $13^{th}$ OFDM symbols, and occupies a PRB pair (pair) 0 and a PRB pair 1 in frequency domain F. The terminal precodes uplink data on different subcarriers by using four different uplink precoding vectors in turn. That is, $0^{th}$, $4^{th}$, and $8^{th}$ subcarriers in the PRB pair 0 and the PRB pair 1 are precoded by using a first uplink precoding vector V0 corresponding to the uplink port port 0; $1^{st}$, $5^{th}$ and $9^{th}$ subcarriers in the PRB pair 0 and the PRB pair 1 are precoded by using a second uplink precoding vector V1 corresponding to the uplink port port 1; $2^{nd}$, $6^{th}$, and $10^{th}$ subcarriers in the PRB pair 0 and the PRB pair 1 are precoded by using a third uplink precoding vector V2 corresponding to the uplink port port 2; and $3^{rd}$, $7^{th}$, and $11^{th}$ subcarriers in the PRB pair 0 and the PRB pair 1 are precoded by using a fourth uplink precoding vector V3 corresponding to the uplink port port 3.

Figure 6B:
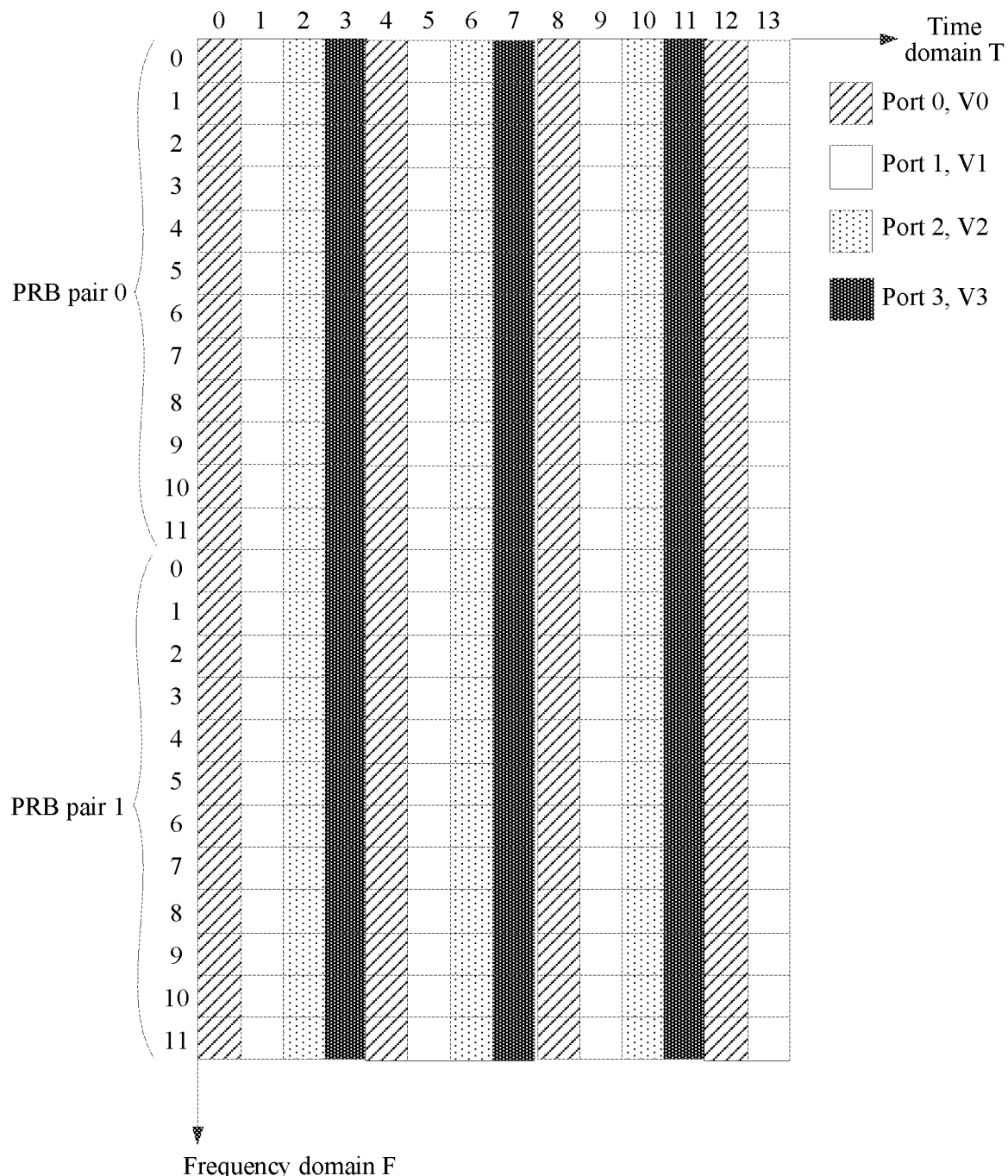
FIG. 6B is a schematic diagram of a principle of performing open-loop precoding on data according to another embodiment of this application.

For example, referring to FIG. 6B, a time-frequency resource used to transmit the uplink data occupies 14 OFDM symbols in total in time domain T, namely, $0^{th}$ to $13^{th}$ OFDM symbols, and occupies a PRB pair (pair) 0 and a PRB pair 1 in frequency domain F. The terminal precodes uplink data on different OFDM symbols by using four different uplink precoding vectors in turn. That is, $0^{th}$, $4^{th}$, $8^{th}$, and $12^{th}$ OFDM symbols are precoded by using a first uplink precoding vector V0 corresponding to the uplink port port 0; $1^{st}$, $5^{th}$, $9^{th}$ and $13^{th}$ symbols are precoded by using a second uplink precoding vector V1 corresponding to the uplink port port 1; $2^{nd}$, $6^{th}$ and $10^{th}$ OFDM symbols are precoded by using a third uplink precoding vector V2 corresponding to the uplink port port 2; and $3^{rd}$, $7^{th}$, and $11^{th}$ OFDM symbols are precoded by using a fourth uplink precoding vector V3 corresponding to the uplink port port 3.

The closed-loop precoding scheme is a scheme in which uplink data on a specified time-frequency resource is precoded by the terminal by using a same uplink precoding vector.

Figure 6C:
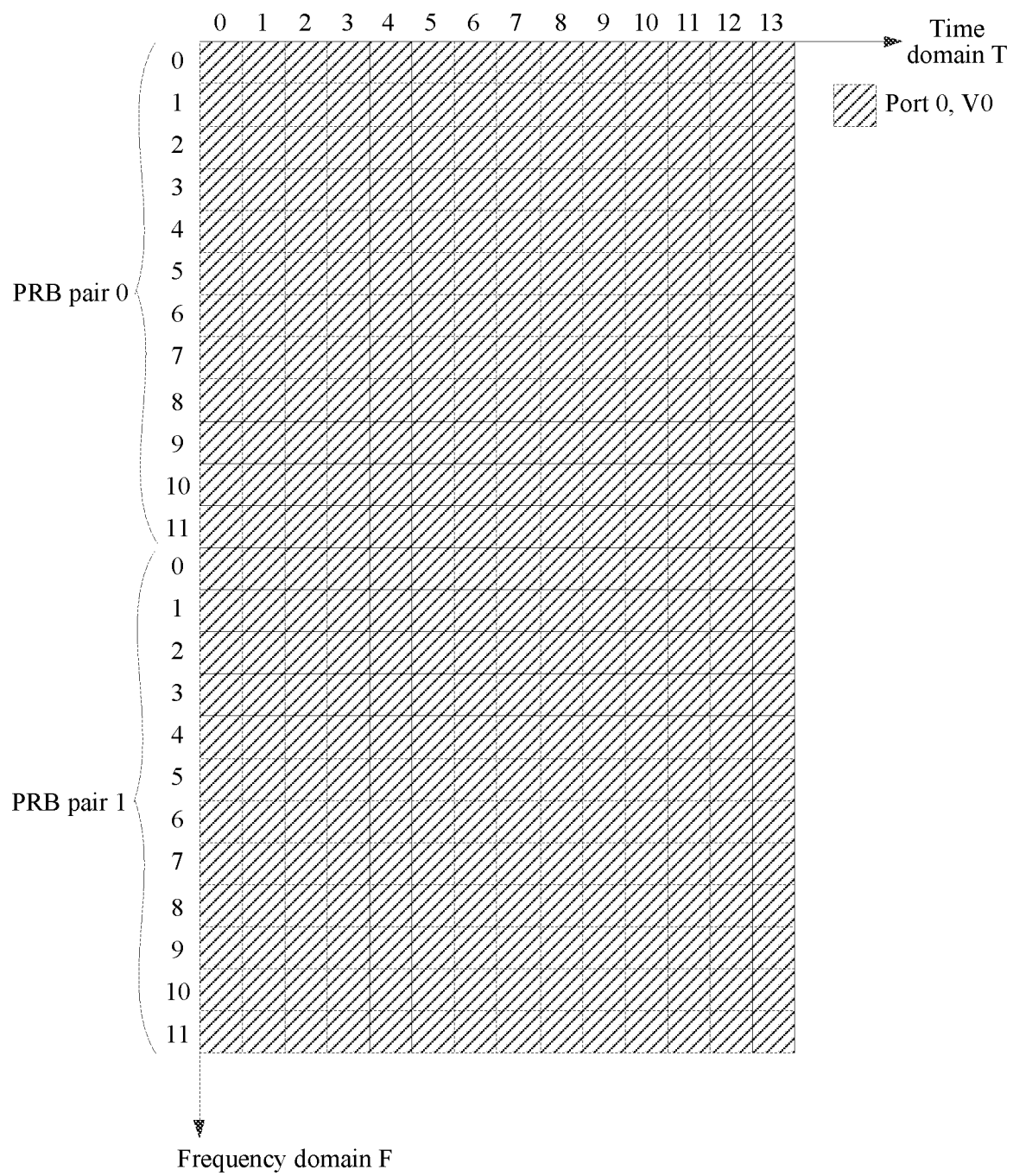
FIG. 6C is a schematic diagram of a principle of performing closed-loop precoding on data according to another embodiment of this application.

For example, referring to FIG. 6C, a time-frequency resource used to transmit the uplink data occupies 14 OFDM symbols in total in time domain T, namely, $0^{th}$ to $13^{th}$ OFDM symbols, and occupies a PRB pair 0 and a PRB pair 1 in frequency domain F. The terminal precodes uplink data on the entire time-frequency resource by using a first uplink precoding vector V0 corresponding to the uplink port port 0.

In an optional embodiment based on the embodiment shown in FIG. 5, the uplink scheduling signaling is further used to indicate a time-frequency resource used for the uplink data, that is, a time-frequency resource of a PUSCH.

Optionally, the time-frequency resource used for the uplink data includes at least two subbands, and uplink data sent on each subband is precoded by using an uplink precoding vector corresponding to an independent resource index. For example, the time-frequency resource used for the uplink data includes a subband 1 and a subband 2, the subband 1 includes two PRBs, and the subband 2 includes three PRBs. Uplink data on the subband 1 is precoded by using the first uplink precoding vector V0 corresponding to the uplink port port 0, and uplink data on the subband 2 is precoded by using the second uplink precoding vector V1 corresponding to the uplink port port 1.

Optionally, uplink data sent on a bandwidth of the time-frequency resource used for the uplink data is precoded by using an uplink precoding vector corresponding to a same resource index.

In an optional embodiment based on the embodiment shown in FIG. 5, the uplink scheduling signaling is further used to indicate a time-frequency resource used for the uplink data, and the time-frequency resource includes a first subband set and a second subband set.

Optionally, the uplink scheduling signaling is further used to instruct to precode, by using the uplink precoding vector corresponding to the resource index, uplink data sent on the first subband set. The first subband set includes at least one subband, and each subband includes at least one PRB, that is, the first subband set is precoded by using the uplink precoding vector corresponding to the resource index provided in the embodiment in FIG. 4 or FIG. 5.

Optionally, the uplink scheduling signaling is further used to instruct to precode, by using an uplink precoding vector determined based on a codebook, uplink data sent on the second subband set. The second subband set includes at least one subband, and each subband includes at least one PRB, that is, the second subband set is precoded by using a conventional uplink precoding vector that is determined based on a codebook. The uplink precoding vector that is determined based on a codebook is determined by the access network device.

In an optional embodiment based on the embodiment shown in FIG. 5, a time domain resource occupied by the downlink configuration instruction and a time domain resource occupied by the downlink reference signal are in a same time unit, the time unit is a timeslot or a subframe or a transmission time interval, and the time unit includes n OFDM symbols (symbols for short). For example, referring to FIG. 7, FIG. 7 is described by using an example in which one time unit includes seven OFDM symbols (or another quantity of OFDM symbols).

The downlink configuration signaling DCI occupies $0^{th}$ to $X1^{th}$ OFDM symbols of the time unit; and the downlink reference signal DL RS occupies $X2^{th}$ to $X3^{th}$ OFDM symbols of the time unit, where X1=1 or 2 or 3, X3=X2 or X2+1, and n−1>X3≥X2≥1.

Figure 7:
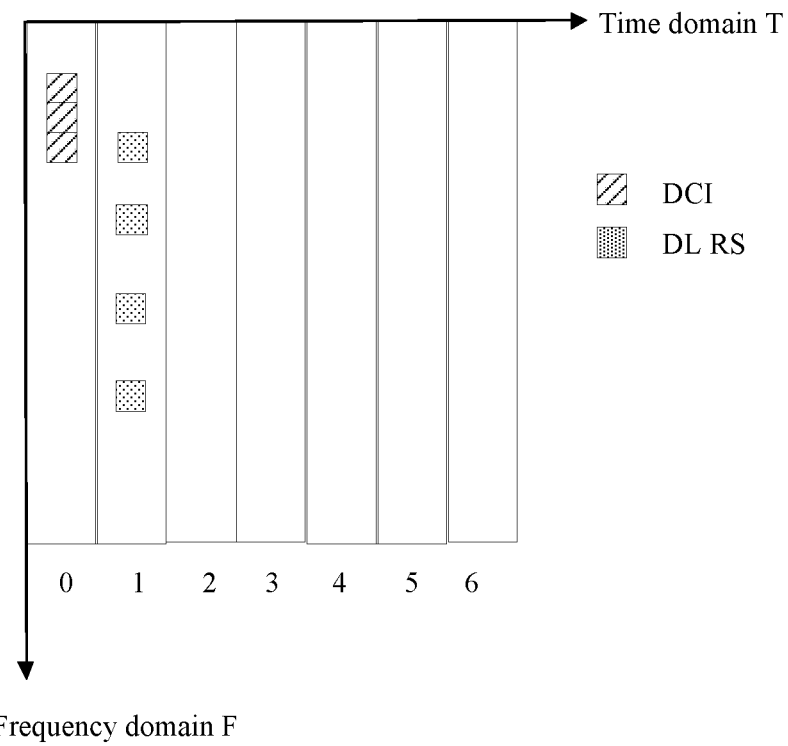
FIG. 7 is a schematic diagram of resource occupation by downlink configuration signaling and a downlink reference signal in a same time unit according to an embodiment of this application.

For example, in FIG. 7, the downlink configuration signaling DCI occupies the $0^{th}$ symbol of the time unit in time domain T, and the downlink reference signal DL RS occupies the $1^{st}$ symbol of the time unit in time domain T. Optionally, the downlink reference signal DL RS occupies consecutive or nonconsecutive frequency-domain bandwidths in frequency domain F.

In an optional embodiment based on the embodiment shown in FIG. 5, a time domain resource occupied by the downlink configuration instruction and a time domain resource occupied by the downlink reference signal are in a same time unit, the time unit is a timeslot or a subframe or a transmission time interval, and the time unit includes n OFDM symbols. For example, referring to FIG. 8, FIG. 8 is described by using an example in which one time unit includes seven OFDM symbols (or another quantity of OFDM symbols).

The downlink configuration signaling DCI occupies $0^{th}$ to $X1^{th}$ OFDM symbols of the time unit;

the downlink reference signal DL RS occupies $X2^{th}$ to $X3^{th}$ OFDM symbols of the time unit; and the SRS occupies $X4^{th}$ to $X5^{th}$ OFDM symbols of the time unit, where $X1=1$ or 2 or 3, $X3=X2$ or $X2+1$, and $n-1 \geq X5 \geq X4 \geq X3+1$.

Figure 8:
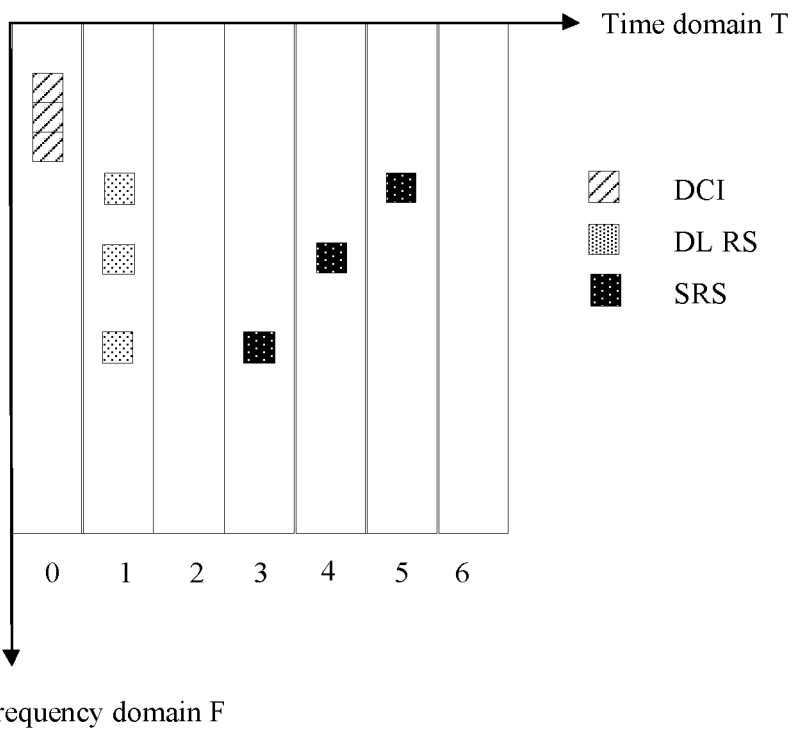
FIG. 8 is a schematic diagram of resource occupation by downlink configuration signaling and a downlink reference signal in a same time unit according to an embodiment of this application.

For example, in FIG. 8, the downlink configuration signaling DCI occupies the $0^{th}$ symbol of the time unit in time domain T, the downlink reference signal DL RS occupies the $1^{st}$ symbol of the time unit in time domain T, and the SRS occupies the $3^{rd}$ to the $5^{th}$ symbols of the time unit in time domain T. Optionally, the downlink reference signal DL RS occupies consecutive or nonconsecutive frequency-domain bandwidths in frequency domain F.

Optionally, if the uplink SRS resource configured by the downlink configuration instruction occupies a plurality of frequency domain resources, the SRS is transmitted in a frequency-hopping manner on m frequency domain resources. That is, in different OFDM symbols, the SRS is transmitted by using different frequency-domain bandwidths.

Optionally, a frequency-domain bandwidth occupied by the time-frequency resource of the downlink reference signal is the same as a frequency-domain bandwidth occupied by the uplink SRS resource.

Figure 9:
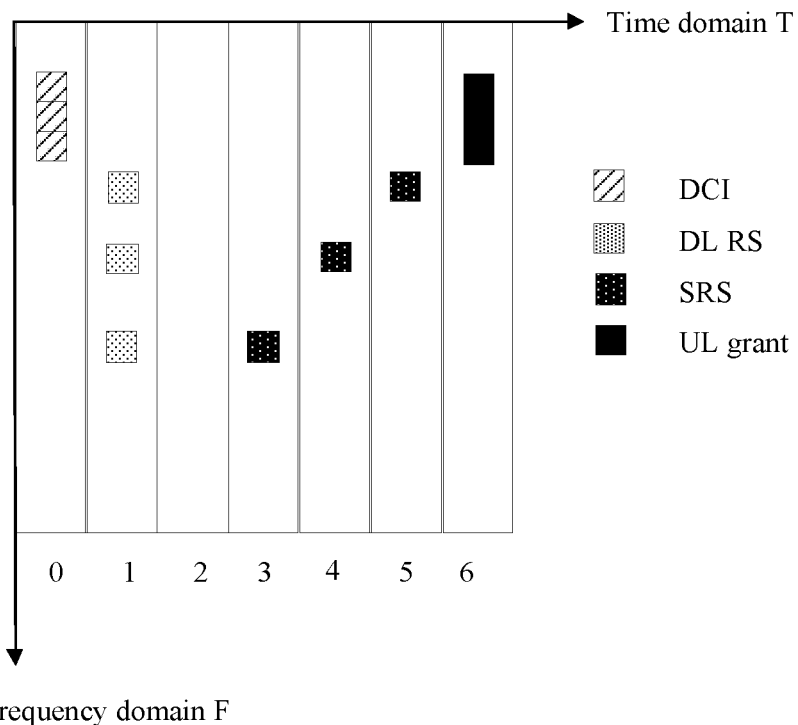
FIG. 9 is a schematic diagram of resource occupation by downlink configuration signaling and a downlink reference signal in a same time unit according to an embodiment of this application.

In an optional embodiment based on the embodiment shown in FIG. 5, a time domain resource occupied by the downlink configuration instruction and a time domain resource occupied by the downlink reference signal are in a same time unit, the time unit is a timeslot or a subframe or a transmission time interval, and the time unit includes n OFDM symbols. For example, referring to FIG. 9, FIG. 9 is described by using an example in which one time unit includes seven OFDM symbols (or another quantity of OFDM symbols).

The downlink configuration signaling DCI occupies $0^{th}$ to $X1^{th}$ OFDM symbols of the time unit;

the downlink reference signal DL RS occupies $X2^{th}$ to $X3^{th}$ OFDM symbols of the time unit;

the SRS (or referred to as the uplink SRS resource) occupies $X4^{th}$ to $X5^{th}$ OFDM symbols of the time unit; and the uplink scheduling signaling UL grant occupies $Y6^{th}$ to $Y7^{th}$ symbols of the time unit, where $X1=1$ or 2 or 3, $X3=X2$ or $X2+1$, and $n-1 \geq X7 \geq X6 \geq X5 \geq X4 \geq X3+1$.

For example, in FIG. 9, the downlink configuration signaling DCI occupies the $0^{th}$ symbol of the time unit in time domain T, the downlink reference signal DL RS occupies the $1^{st}$ symbol of the time unit in time domain T, the SRS occupies the $3^{rd}$ to the $5^{th}$ symbols of the time unit in time domain T, and the uplink scheduling signaling UL grant occupies the $6^{th}$ symbol of the time unit.

Optionally, if the uplink SRS resource configured by the downlink configuration instruction occupies a plurality of frequency domain resources, the SRS is transmitted in a frequency-hopping manner on m frequency domain resources. That is, in different OFDM symbols, the SRS is transmitted by using different frequency-domain bandwidths.

Optionally, a frequency-domain bandwidth occupied by the time-frequency resource of the downlink reference signal is the same as a frequency-domain bandwidth occupied by the uplink SRS resource.

In conclusion, in the data sending method provided in this embodiment, the terminal can rapidly and efficiently send the uplink data to the access network device in one time domain unit.

It should be noted that, the optional embodiments based on the embodiment shown in FIG. 5 may further be combined for implementation. Combined implementations of the foregoing optional embodiments are easily figured out by persons skilled in the art based on the descriptions of the foregoing optional embodiments, and are not described in this specification.

It should be noted that, in the embodiment shown in FIG. 5 or each optional embodiment, the steps performed by the terminal may be independently implemented as a data sending method on the terminal side, and the steps performed by the access network device may be independently implemented as an uplink data receiving method on the access network device side.

It should be noted that, the resource occupation diagrams in FIG. 7 to FIG. 9 are merely examples for description, and do not represent accurate resource positions of various signals or data.

In an optional embodiment based on the embodiment shown in FIG. 5, the uplink scheduling signaling is sent by using two levels of control signaling. For details of this part, refer to the following embodiments.

Figure 10:
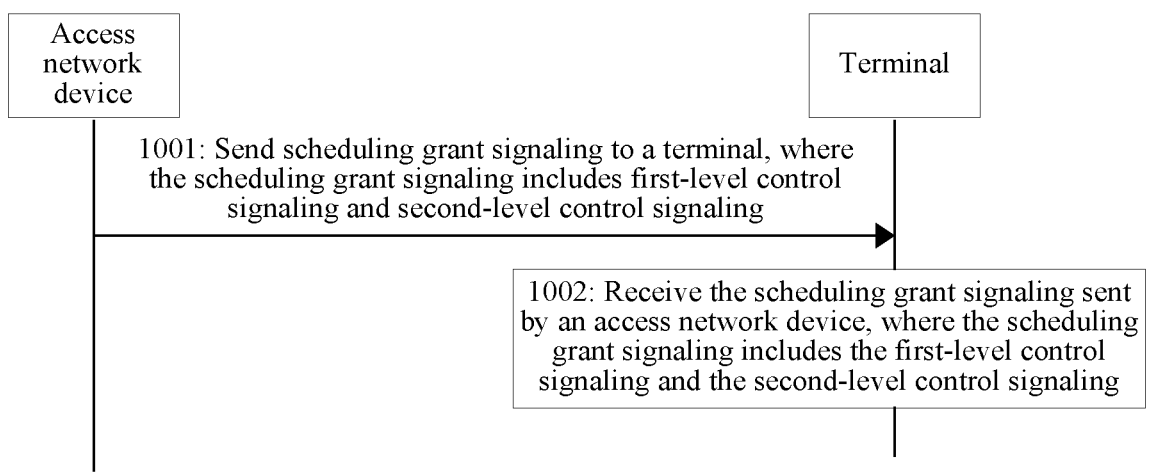
FIG. 10 is a method flowchart of a signaling sending method according to an embodiment of this application.

FIG. 10 is a flowchart of a signaling sending method according to an embodiment of this application. This embodiment is described by using an example in which the signaling sending method is applied to the communications system shown in FIG. 1. The method may also be implemented in combination with the embodiment shown in FIG. 4 or FIG. 5. The signaling sending method includes the following steps.

Step 1001: An access network device sends scheduling grant signaling to a terminal, where the scheduling grant signaling includes first-level control signaling and second-level control signaling.

The first-level control signaling is used to indicate common scheduling information in M transmission modes.

The second-level control signaling is used to indicate specific scheduling information in the M transmission modes.

M is an integer greater than or equal to 2.

Step 1002: The terminal receives the scheduling grant signaling sent by the access network device, where the scheduling grant signaling includes the first-level control signaling and the second-level control signaling.

Optionally, the scheduling grant signaling is a downlink scheduling grant or an uplink scheduling grant (UL grant).

In conclusion, in the signaling sending method provided in this embodiment, the scheduling grant signaling is sent to the terminal by using two levels of control signaling, and the common scheduling information in the M transmission modes is centrally sent in the first-level control signaling, so that transmission resource overheads of the scheduling grant signaling can be reduced, the access network device can control the terminal more efficiently, and the terminal can quickly switch between different transmission modes.

In an optional embodiment based on the embodiment shown in FIG. 10, a scheduling grant instruction is an uplink scheduling grant. The M transmission modes include at least two of the following transmission modes:

a single-antenna transmission mode;

a transmit diversity transmission mode;

a codebook-based open-loop precoding scheme;

a codebook-based closed-loop precoding scheme;

a channel reciprocity-based open-loop precoding scheme; and a channel reciprocity-based closed-loop precoding scheme, where the codebook-based open-loop precoding scheme is a scheme in which uplink data on different time-frequency resources is precoded by using, in turn, precoding vectors in a codebook indicated by the access network device; the codebook-based closed-loop precoding scheme is a scheme in which uplink data on a specified time-frequency resource is precoded by using a precoding matrix in a codebook indicated by the access network device; the channel reciprocity-based open-loop precoding scheme is a scheme in which uplink data on different time-frequency resources is precoded by using, in turn, precoding vectors that are obtained through downlink channel (or downlink reference signal) measurement; and the channel reciprocity-based closed-loop precoding scheme is a scheme in which uplink data on a specified time-frequency resource is precoded by using a precoding vector that is obtained through downlink channel (or downlink reference signal) measurement.

In an optional embodiment based on the embodiment shown in FIG. 10, a scheduling grant instruction is a downlink scheduling grant. The M transmission modes include at least two of the following transmission modes:

a single-antenna transmission mode;
a transmit diversity transmission mode;
an open-loop precoding scheme; and
a closed-loop precoding scheme, where
the open-loop precoding scheme is a scheme in which downlink data on different time-frequency resources is precoded by using, in turn, precoding vectors in a codebook indicated by the access network device, and the closed-loop precoding scheme is a scheme in which downlink data on a specified time-frequency resource is precoded by using a precoding matrix in a codebook indicated by the access network device.

In an optional embodiment based on the embodiment shown in FIG. 10, the first-level control signaling includes:

first scheduling resource indication information, and indication information of a transmission mode of the second-level control signaling; or first scheduling resource indication information, indication information of a transmission mode of the second-level control signaling, and a first MSC; or first scheduling resource indication information, indication information of a transmission mode of the second-level control signaling, a first MSC, and demodulation pilot port information; or first scheduling resource indication information, indication information of a transmission mode of the second-level control signaling, a first MSC, and first-level precoding matrix indication information; or first scheduling resource indication information, indication information of a transmission mode of the second-level control signaling, and first-level precoding matrix indication information; or first scheduling resource indication information, indication information of a transmission mode of the second-level control signaling, a first MSC, first-level precoding matrix indication information, a power control command, channel measurement triggering information, and resource configuration information of the uplink SRS resource, where the first MCS is an MCS of a first transport block, or an MCS in an assumed first transmission mode.

The first scheduling resource indication information is used to indicate a time-frequency resource of a data channel; the indication information of the transmission mode of the second-level control signaling is used to indicate one of the M transmission modes; the demodulation pilot port information is used to indicate at least one of the following information: a time-frequency resource used for data pilot demodulation, a port index for pilot demodulation, and a spreading code for pilot demodulation; the first-level precoding matrix indication information (PMI) is used to indicate a first-level precoding matrix, where the first-level precoding matrix includes at least one precoding vector; the power control command is used to indicate a parameter related to uplink transmit power to the terminal; and the channel measurement triggering information is used to trigger the terminal to measure the downlink reference signal and feed back a channel measurement result.

In an optional embodiment based on the embodiment shown in FIG. 10, the second-level control signaling includes:

second-level precoding matrix indication information; or a second MCS and second-level precoding matrix indication information; or the second MCS and the second-level precoding matrix indication information; or a second MCS, second-level precoding matrix indication information, and the demodulation pilot port information; or a second MCS, second-level precoding matrix indication information, and second scheduling resource indication information, where the second MCS is an MCS of a second transport block, or a differential MCS for the MCS in the first transmission mode relative to that in the transmission mode of the second-level control signaling; and the second scheduling resource indication information is used to indicate a resource in a time-frequency resource range indicated by the first scheduling resource indication information. For example, the first scheduling resource indication information is used to indicate 10 PRBs from 100 PRBs to serve as transmission resources of a data channel, and the second scheduling resource indication information is used to more accurately indicate three PRBs from the 10 PRBs.

Optionally, the first-level precoding matrix indication information is used to determine a first-level precoding matrix W1 in a double codebook structure, and the second-level precoding matrix information is used to determine a second-level precoding matrix W2 in the double codebook structure.

A form of the first-level precoding matrix $W_1^{(k)}$ in the double codebook structure is as follows:

$B = [b_0 \ b_1 \ \ldots \ b_{31}]$, $$[B]_{1+m, 1+n} = e^{j\frac{2\pi mn}{32}},$$

m=0, 1, 2, 3, n=0, 1, ..., 31

$X^{(k)} \in \{[b_{2k \bmod 32} \ b_{(2k+1) \bmod 32} \ b_{(2k+2) \bmod 32} \ b_{(2k+3) \bmod 32}]:$ k=0, 1, ..., 15\}

$$W_1^{(k)} = \begin{bmatrix} X^{(k)} & 0 \\ 0 & X^{(k)} \end{bmatrix}$$

Codebook 1: $C_1 = \{W_1^{(0)}, W_1^{(1)}, W_1^{(2)}, \ldots, W_1^{(15)}\}$

A form of the second-level precoding matrix in the double codebook structure is as follows:

Rank 1:

$$W_2 \in C_2 = \left\{ \frac{1}{\sqrt{2}}\begin{bmatrix} Y \\ Y \end{bmatrix}, \frac{1}{\sqrt{2}}\begin{bmatrix} Y \\ jY \end{bmatrix}, \frac{1}{\sqrt{2}}\begin{bmatrix} Y \\ -Y \end{bmatrix}, \frac{1}{\sqrt{2}}\begin{bmatrix} Y \\ -jY \end{bmatrix} \right\}$$

$Y \in \{\tilde{e}_1, \tilde{e}_2, \tilde{e}_3, \tilde{e}_4\}$

Rank 2:

$$W_2 \in C_2 = \left\{ \frac{1}{\sqrt{2}}\begin{bmatrix} Y_1 & Y_2 \\ Y_1 & -Y_2 \end{bmatrix}, \frac{1}{\sqrt{2}}\begin{bmatrix} Y_1 & Y_2 \\ jY_1 & -jY_2 \end{bmatrix} \right\}$$

$(Y_1, Y_2) \in$ $\{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3), (\tilde{e}_1, \tilde{e}_4), (\tilde{e}_2, \tilde{e}_4)\}$ For another rank, refer to a design principle of a codebook in LTE, and examples are not detailed.

Figure 11:
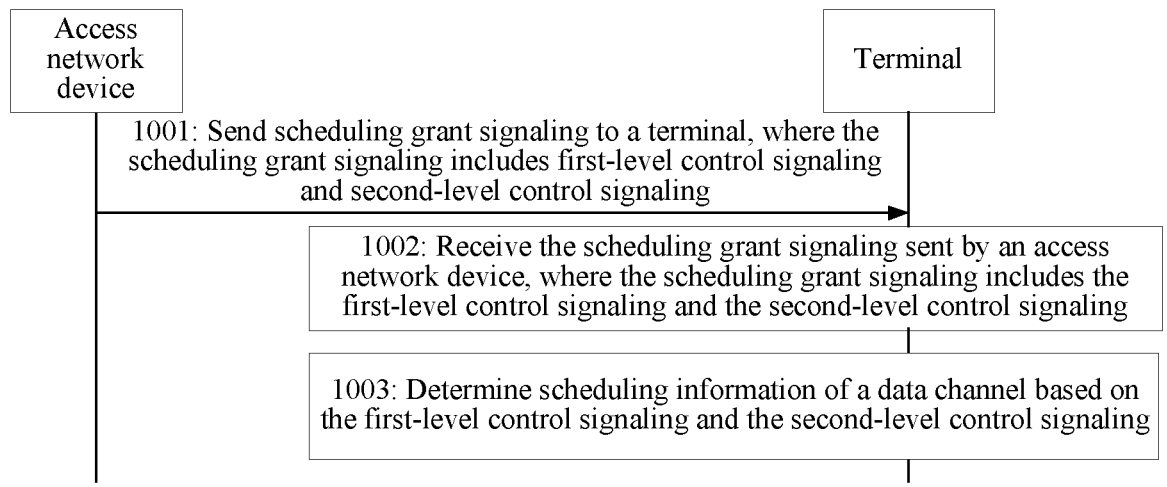
FIG. 11 is a method flowchart of a signaling sending method according to another embodiment of this application.

In an optional embodiment based on the embodiment shown in FIG. 10, the foregoing method further includes step 1003, as shown in FIG. 11.

Step 1003: The terminal determines scheduling information of a data channel based on the first-level control signaling and the second-level control signaling.

In a broad sense, the data channel in this embodiment refers to a channel used to transmit data, and also refers to data transmitted on the channel. For example, a PUSCH may be understood as a PUSCH channel, and may also be understood as uplink data transmitted on the PUSCH; a physical downlink shared channel (PDSCH) may be understood as a PDSCH channel, and may also be understood as downlink data transmitted on the PDSCH.

The scheduling information of the data channel includes but is not limited to: a time-frequency resource (or referred to as a time-frequency resource position) of the data channel, a precoding vector of data transmitted on each time-frequency resource, an MCS of data transmitted on each time-frequency resource, or the like.

Optionally, with respect to determining the time-frequency resource of the data channel, step 1003 includes the following step:

determining, by the terminal, the time-frequency resource of the data channel based on first scheduling resource information; or determining, by the terminal, the time-frequency resource of the data channel based on first scheduling resource information and second scheduling resource information.

Optionally, with respect to determining the precoding vector of the data transmitted on each time-frequency resource, step 1003 includes the following steps:

1. determining, by the terminal, a first precoding matrix W1 in a double codebook structure based on the first-level precoding matrix indication information in the first-level control signaling;

2. determining, by the terminal, a second precoding matrix W2 in the double codebook structure based on the second-level precoding matrix indication information in the second-level control signaling; and 3. determining, by the terminal based on the first precoding matrix W1 and the second precoding matrix W2, a precoding matrix used for data transmitted on the data channel.

Optionally, the terminal multiplies the first precoding matrix W1 by the second precoding matrix W2, to obtain the precoding matrix used for the data transmitted on the data channel.

Optionally, the first-level precoding matrix indication information is information that remains valid before first precoding matrix indication information in a next piece of first-level control signaling is received; and the second-level precoding matrix indication information is indication information that is valid during current scheduling.

Optionally, the first-level control signaling and the second-level control signaling occupy different OFDM symbols in a same time unit; the first-level control signaling occupies first n OFDM symbols in the time unit, where n is a positive integer; and the second-level control signaling occupies a data scheduling bandwidth in the time unit.

Optionally, the first-level control signaling and the second-level control signaling occupy different time units. The second-level control signaling is used jointly with most recent first-level control signaling that is sent before the second-level control signaling, to determine the scheduling information of the data channel.

Optionally, two pieces of first-level control signaling respectively occupy an $i^{th}$ time unit and an $(i+j)^{th}$ time unit, and there is an $(i+k)^{th}$ time unit that is occupied by at least two pieces of second-level control signaling, where $0 \leq k \leq j$, and i, j, and k are all integers.

Figure 12A:
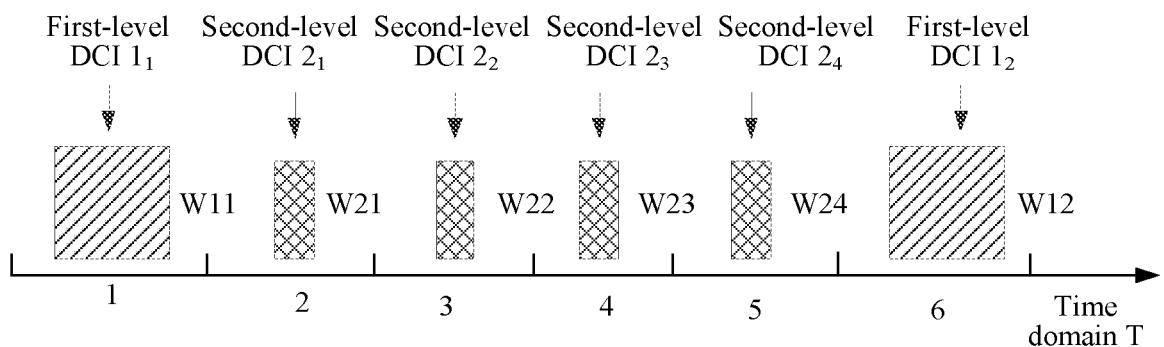
FIG. 12A is a schematic diagram of time sequence occupation by first-level control signaling and second-level control signaling according to an embodiment of this application.

For example, referring to FIG. 12A, in time domain T, first-level control signaling DCI $1_1$ occupies the $1^{st}$ time unit, second-level control signaling DCI $2_1$ occupies the $2^{nd}$ time unit, second-level control signaling DCI $2_2$ occupies the $3^{rd}$ time unit, second-level control signaling DCI $2_3$ occupies the $4^{th}$ time unit, second-level control signaling DCI $2_4$ occupies the $5^{th}$ time unit, and first-level control signaling DCI $1_2$ occupies the $6^{th}$ time unit.

There are four pieces of second-level control signaling between the first-level control signaling DCI $1_1$ and the first-level control signaling DCI $1_2$: DCI $2_1$, DCI $2_2$, DCI $2_3$, and DCI $2_4$.

A first-level precoding matrix indicated by first-level precoding matrix indication information in the first-level control signaling DCI $1_1$ is W11, a second-level precoding matrix indicated by second-level precoding matrix indication information in the second-level control signaling DCI $2_1$ is W21, a second-level precoding matrix indicated by second-level precoding matrix indication information in the second-level control signaling DCI $2_2$ is W22, a second-level precoding matrix indicated by second-level precoding matrix indication information in the second-level control signaling DCI $2_3$ is W23, a second-level precoding matrix indicated by second-level precoding matrix indication information in the second-level control signaling DCI $2_4$ is W24, and a first-level precoding matrix indicated by first-level precoding matrix indication information in the first-level control signaling DCI $1_2$ is W12.

Optionally, the first-level precoding matrix indicated by the first-level precoding matrix indication information corresponds to a wideband, and the second-level precoding matrix indicated by the second-level precoding matrix indication information corresponds to a subband. That is, the first-level precoding matrix indication information is applicable to a precoding matrix of an entire frequency-domain bandwidth of the first-level control signaling, and the second-level precoding matrix indication information is applicable only to a precoding matrix of the subband indicated by the second control instruction.

Optionally, the second-level control signaling is used jointly with most recent first-level control signaling that is sent before the second-level control signaling, to determine the scheduling information of the data channel. That is, the terminal determines the time-frequency resource of the data channel by jointly using second scheduling resource information in the second-level control signaling and first scheduling resource information in most recent first-level control signaling that is sent before the second-level control signaling.

Figure 12B:
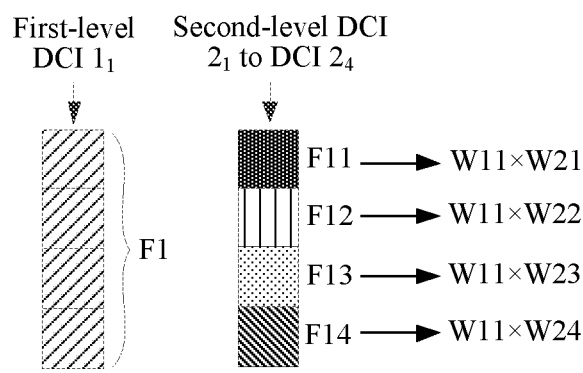
FIG. 12B is a schematic diagram of a principle of determining, based on both first-level control signaling and second-level control signaling, a precoding matrix used for data in a data channel according to an embodiment of this application.

For example, referring to FIG. 12A and FIG. 12B, FIG. 12B is a schematic diagram of a frequency-domain bandwidth of a time-frequency resource of a data channel.

It is assumed that a frequency-domain bandwidth occupied by the time-frequency resource indicated by the first scheduling resource information in the first-level control signaling DCI 11 is a wideband F1, a frequency-domain bandwidth occupied by the time-frequency resource indicated by the second scheduling resource information in the second-level control signaling DCI 21 is a subband F11, a frequency-domain bandwidth occupied by the time-frequency resource indicated by the second scheduling resource information in the second-level control signaling DCI 22 is a subband F12, a frequency-domain bandwidth occupied by the time-frequency resource indicated by the second scheduling resource information in the second-level control signaling DCI 23 is a subband F13, and a frequency-domain bandwidth occupied by the time-frequency resource indicated by the second scheduling resource information in the second-level control signaling DCI 24 is a subband F14.

The subband F11, the subband F12, the subband F13, and the subband F14 are all a part of the wideband F1. Each subband includes at least one PRB, and bandwidths of the subbands are the same or are different.

The first-level precoding matrix W11 is applicable to the entire wideband F1, the second-level precoding matrix W21 is applicable to the subband F11, the second-level precoding matrix W22 is applicable to the subband F12, the second-level precoding matrix W23 is applicable to the subband F13, and the second-level precoding matrix W24 is applicable to the subband F14.

Optionally, the terminal determines, by jointly using the second-level precoding matrix indication information of the second-level control signaling and first-level precoding matrix indication information of most recent first-level control signaling that is sent before the second-level control signaling, a precoding matrix (or a precoding vector) used for data.

When the terminal determines a precoding matrix used for data in the subband F11, a precoding matrix W11*W21 obtained by using a product of W11 and W21 is used. When the terminal determines a precoding matrix used for data in the subband F12, a precoding matrix W11*W22 obtained by using a product of W11 and W22 is used. When the terminal determines a precoding matrix used for data in the subband F13, a precoding matrix W11*W23 obtained by using a product of W11 and W23 is used. When the terminal determines a precoding matrix used for data in the subband F14, a precoding matrix W11*W24 obtained by using a product of W11 and W24 is used.

It can be learned from FIG. 12A and FIG. 12B that, the first-level precoding matrix indication information is information that remains valid before first precoding matrix indication information in a next piece of first-level control signaling is received; and the second-level precoding matrix indication information is indication information that is valid during current scheduling.

In an optional embodiment based on the embodiment in FIG. 10, the first-level control signaling and the second-level control signaling occupy different OFDM symbols in a same time unit; the first-level control signaling occupies first n OFDM symbols in the time unit, where n is a positive integer; and the second-level control signaling occupies a data scheduling bandwidth in the time unit.

In an optional embodiment based on the embodiment in FIG. 10, the first-level control signaling is further used to indicate a time-frequency position of the second-level control signaling. The terminal receives a time-frequency position of the first-level control signaling by using a UE blind detection technology, and receives the second-level control signaling by using the time-frequency position of the second-level control signaling indicated by the first-level control signaling.

In an optional embodiment based on the embodiment in FIG. 10, among the M transmission modes, there is at least one transmission mode that corresponds only to the first-level control signaling and does not require the second-level control signaling, for example, the single-antenna transmission mode. In this case, after receiving the first-level control signaling, the terminal stops detecting the second-level control signaling.

It should be noted that, the steps performed by the terminal in FIG. 10 or FIG. 11 may be independently implemented as a signaling receiving method on the terminal side, and the steps performed by the access network device in FIG. 10 or FIG. 11 may be independently implemented as a signaling sending method on the access network device side.

The following are apparatus embodiments of the embodiments of this application. For details that are not described in detail in the apparatus embodiments, refer to the corresponding method embodiments above.

Figure 13:
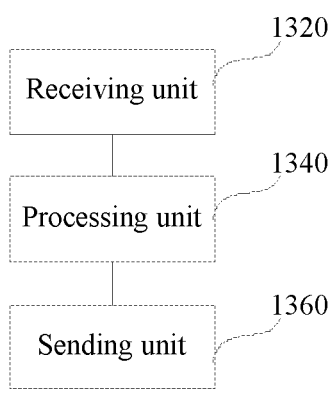
FIG. 13 is a block diagram of a data sending apparatus according to an embodiment of this application.

FIG. 13 is a block diagram of a data sending apparatus according to an embodiment of this application. The message sending apparatus may be implemented as an entire terminal or a part of a terminal by using a dedicated hardware circuit or a combination of software and hardware. The message sending apparatus includes a receiving unit 1320, a processing unit 1340, and a sending unit 1360.

The receiving unit 1320 is configured to implement the receiving functions in step 402, step 407, step 502, and step 504, and another implicit step of receiving information by the terminal.

The processing unit 1320 is configured to implement the functions in step 403, step 408, step 505, and step 510, and another implicit step or data of processing information by the terminal.

The sending unit 1340 is configured to implement the sending functions in step 404, step 409, step 506, step 509, and step 511, and another implicit step of sending information by the terminal.

For related details, refer to the method embodiments described in FIG. 4, FIG. 5, FIG. 10, or FIG. 11.

It should be noted that, the receiving unit 1320 may be implemented by a receiver, or implemented by a processor cooperating with a receiver; the processing unit 1340 may be implemented by a processor, or implemented by a processor executing a program instruction in a memory; and the sending unit 1360 may be implemented by a transmitter, or implemented by a processor cooperating with a transmitter.

It should be further noted that, when implementing the steps of the embodiments shown in FIG. 10 or FIG. 11, the data sending apparatus may receive downlink data.

Figure 14:
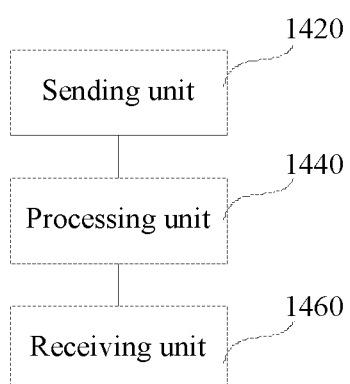
FIG. 14 is a block diagram of a data receiving apparatus according to an embodiment of this application.

FIG. 14 is a block diagram of a data receiving apparatus according to another embodiment of this application. The data receiving apparatus may be implemented as an entire access network terminal or a first access network device or a part of an access network terminal or a first access network device by using a dedicated hardware circuit or a combination of software and hardware. The data receiving apparatus includes a sending unit 1420, a processing unit 1440, and a receiving unit 1440.

The sending unit 1420 is configured to implement the sending functions in step 401, step 406, step 501, step 503, and step 508, and another implicit step of sending information by the access network terminal.

The processing unit 1440 is configured to implement the processing function in step 408, and another implicit step of processing information by the access network device.

The receiving unit 1440 is configured to implement the receiving functions in step 405, step 410, step 507, and step 512, and another implicit step of receiving information by the access network device.

For related details, refer to the method embodiments described in FIG. 4, FIG. 5, FIG. 10, or FIG. 11.

It should be noted that, the sending unit 1420 may be implemented by a transmitter, or implemented by a processor cooperating with a transmitter; the processing unit 1440 may be implemented by a processor, or implemented by a processor executing a program instruction in a memory; and the receiving unit 1460 may be implemented by a receiver Rx, or implemented by a processor cooperating with a receiver.

It should be further noted that, when implementing the steps of the embodiments shown in FIG. 10 or FIG. 11, the data receiving apparatus may send downlink data.

The sequence numbers of the foregoing embodiments of this application are merely for illustrative purposes, and are not intended to indicate priorities of the embodiments.

Persons of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely examples of embodiments of this application, but are not intended to limit this application. Any modification, equivalent replacement, or improvement made without departing from the spirit and principle of this application should fall within the protection scope of this application.

What is claimed is:

1. An apparatus, comprising:
a receiver, configured to receive downlink configuration signaling and a downlink reference signal from an access network device, wherein the downlink configuration signaling indicates a time-frequency resource of the downlink reference signal, a plurality of uplink sounding reference signal SRS resources, a sequence resource of SRSs, and a code resource of the SRSs; and
a processor, configured to obtain a plurality of uplink precoding vectors from downlink reference signal measurements; and
a transmitter, configured to send the SRSs to the access network device on the plurality of uplink SRS resources, wherein SRSs sent on different uplink SRS resources are precoded by using different uplink precoding vectors of the plurality of uplink precoding vectors, wherein the receiver is further configured to receive an uplink scheduling signaling from the access network device, wherein the uplink scheduling signaling is used to indicate a resource index of at least one of the uplink SRS resources, the processor is further configured to precode uplink data according to an uplink precoding vector corresponding to the resource index, and the transmitter is further configured to send the precoded uplink data to the access network device, wherein a time domain resource occupied by the downlink configuration signaling and a time domain resource occupied by the downlink reference signal are in a same timeslot, and the timeslot comprises n OFDM symbols, the downlink configuration signaling occupies $0^{th}$ to $X1^{th}$ OFDM symbols of the timeslot, the downlink reference signal occupies $X2^{th}$ to $X3^{th}$ OFDM symbols of the timeslot, and $X1=1$ or 2 or 3, $X3=X2$ or $X2+1$, and $n-1>X3$.

2. The apparatus according to claim 1, the downlink reference signal is a CSI-RS.

3. A method, wherein the method comprises:
receiving, by a terminal, downlink configuration signaling and a downlink reference signal from an access network device, wherein the downlink configuration signaling indicates a time-frequency resource of the downlink reference signal, a plurality of uplink sounding reference signal SRS resources, a sequence resource of SRSs, and a code resource of the SRSs; and
obtaining, by the terminal, a plurality of uplink precoding vectors from downlink reference signal measurements;
sending, by the terminal, the SRSs to the access network device on the plurality of uplink SRS resources, wherein SRSs sent on different uplink SRS resources are precoded by using different uplink precoding vectors of the plurality of uplink precoding vectors;
receiving, by the terminal, an uplink scheduling signaling from the access network device, wherein the uplink scheduling signaling is used to indicate a resource index of at least one uplink SRS resource; and
precoding, by the terminal, uplink data by using an uplink precoding vector corresponding to the resource index, and sending the precoded uplink data to the access network device,
wherein a time domain resource occupied by the downlink configuration signaling and a time domain resource occupied by the downlink reference signal are in a same timeslot, and the timeslot comprises n OFDM symbols,
the downlink configuration signaling occupies $0^{th}$ to $X1^{th}$ OFDM symbols of the timeslot,
the downlink reference signal occupies $X2^{th}$ to $X3^{th}$ OFDM symbols of the timeslot, and
$X1=1$ or 2 or 3, $X3=X2$ or $X2+1$, and $n-1>X3$.

4. The method according to claim 3, the downlink reference signal is a CSI-RS.

5. A communication device, comprising:
a non-transitory memory storage comprising instructions; and
one or more processors in communication with the memory, wherein the one or more processors execute the instructions to: receiving, downlink configuration signaling and a downlink reference signal from an access network device, wherein the downlink configuration signaling indicates a time-frequency resource of the downlink reference signal, a plurality of uplink sounding reference signal SRS resources, a sequence resource of SRSs, and a code resource of the SRSs; and
obtaining, a plurality of uplink precoding vectors from downlink reference signal measurements;
sending, by the terminal, the SRSs to the access network device on the plurality of uplink SRS resources, wherein SRSs sent on different uplink SRS resources are precoded by using different uplink precoding vectors of the plurality of uplink precoding vectors;

receiving, by the terminal, an uplink scheduling signaling sent from the access network device, wherein the uplink scheduling signaling is used to indicate a resource index of at least one uplink SRS resource; and precoding, by the terminal, uplink data by using an uplink precoding vector corresponding to the resource index, and sending the precoded uplink data to the access network device, wherein a time domain resource occupied by the downlink configuration signaling and a time domain resource occupied by the downlink reference signal are in a same timeslot, and the timeslot comprises n OFDM symbols, the downlink configuration signaling occupies $0^{th}$ to $X1^{th}$ OFDM symbols of the timeslot, the downlink reference signal occupies $X2^{th}$ to $X3^{th}$ OFDM symbols of the timeslot, and X1=1 or 2 or 3, X3=X2 or X2+1, and n−1>X3.

6. The communication device according to claim 5, the downlink reference signal is a CSI-RS.

7. An apparatus, wherein the apparatus comprises:

a transmitter, configured to send downlink configuration signaling and a downlink reference signal to a terminal, the downlink configuration signaling indicates a time-frequency resource of the downlink reference signal, a plurality of uplink sounding reference signal SRS resources, a sequence resource of SRSs, and a code resource of the SRSs;

a receiver, configured to receive the SRSs from the terminal on a plurality of uplink SRS resources, wherein SRSs on different uplink SRS resources are precoded by using different uplink precoding vectors of the plurality of uplink precoding vectors, wherein the transmitter is further configured to send uplink scheduling signaling to the terminal, wherein the uplink scheduling signaling indicates a resource index of the plurality of uplink SRS resources; and the receiver is further configured to receive uplink data from the terminal, wherein the uplink data is data precoded by using an uplink precoding vector corresponding to the resource index, wherein a time domain resource occupied by the downlink configuration signaling and a time domain resource occupied by the downlink reference signal are in a same timeslot, and the timeslot comprises n OFDM symbols, the downlink configuration signaling occupies $0^{th}$ to $X1^{th}$ OFDM symbols of the timeslot, the downlink reference signal occupies $X2^{th}$ to $X3^{th}$ OFDM symbols of the timeslot, and X1=1 or 2 or 3, X3=X2 or X2+1, and n−1>X3.

8. A method, wherein the method comprises:

sending, a downlink configuration signaling and a downlink reference signal to a terminal, the downlink configuration signaling indicates a time-frequency resource of the downlink reference signal, a plurality of uplink sounding reference signal SRS resources, a sequence resource of SRSs, and a code resource of the SRSs;

receiving, the SRSs from the terminal on a plurality of uplink SRS resources, wherein SRSs on different uplink SRS resources are precoded by using different uplink precoding vectors of the plurality of uplink precoding vectors;

sending, uplink scheduling signaling to the terminal, wherein the uplink scheduling signaling indicates a resource index of the plurality of uplink SRS resources; and receiving, uplink data from the terminal, wherein the uplink data is data precoded by using an uplink precoding vector corresponding to the resource index, wherein a time domain resource occupied by the downlink configuration signaling and a time domain resource occupied by the downlink reference signal are in a same timeslot, and the timeslot comprises n OFDM symbols, the downlink configuration signaling occupies $0^{th}$ to $X1^{th}$ OFDM symbols of the timeslot, the downlink reference signal occupies $X2^{th}$ to $X3^{th}$ OFDM symbols of the timeslot, and X1=1 or 2 or 3, X3=X2 or X2+1, and n−1>X3.

9. A communication device, comprising:

a non-transitory memory storage comprising instructions; and one or more processors in communication with the memory, wherein the one or more processors execute the instructions to:

sending, a downlink configuration signaling and a downlink reference signal to a terminal, the downlink configuration signaling indicates a time-frequency resource of the downlink reference signal, a plurality of uplink sounding reference signal SRS resources, a sequence resource of SRSs, and a code resource of the SRSs;

receiving, the SRSs from the terminal on a plurality of uplink SRS resources, wherein SRSs on different uplink SRS resources are precoded by using different uplink precoding vectors of the plurality of uplink precoding vectors;

sending, uplink scheduling signaling to the terminal, wherein the uplink scheduling signaling indicates a resource index of the plurality of uplink SRS resources; and receiving, uplink data from the terminal, wherein the uplink data is data precoded by using an uplink precoding vector corresponding to the resource index, wherein a time domain resource occupied by the downlink configuration signaling and a time domain resource occupied by the downlink reference signal are in a same timeslot, and the timeslot comprises n OFDM symbols, the downlink configuration signaling occupies $0^{th}$ to $X1^{th}$ OFDM symbols of the timeslot, the downlink reference signal occupies $X2^{th}$ to $X3^{th}$ OFDM symbols of the timeslot, and X1=1 or 2 or 3, X3=X2 or X2+1, and n−1>X3.

* * * * *